United States Patent
Bai et al.

(10) Patent No.: US 11,949,521 B2
(45) Date of Patent: Apr. 2, 2024

(54) DATA TRANSMISSION METHOD AND DEVICE

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Tony Ekpenyong, Beijing (CN); Yanping Xing, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 469 days.

(21) Appl. No.: 17/279,672

(22) PCT Filed: Sep. 16, 2019

(86) PCT No.: PCT/CN2019/105897
§ 371 (c)(1),
(2) Date: Mar. 25, 2021

(87) PCT Pub. No.: WO2020/063378
PCT Pub. Date: Apr. 2, 2020

(65) Prior Publication Data
US 2021/0399848 A1   Dec. 23, 2021

(30) Foreign Application Priority Data

Sep. 28, 2018 (CN) .......................... 201811143435.6
Oct. 18, 2018 (CN) .......................... 201811216019.4
Nov. 2, 2018 (CN) .......................... 201811302730.1

(51) Int. Cl.
*H04L 1/22* (2006.01)
*H04L 1/08* (2006.01)
*H04L 5/00* (2006.01)

(52) U.S. Cl.
CPC .................. *H04L 1/22* (2013.01); *H04L 1/08* (2013.01); *H04L 5/0048* (2013.01)

(58) Field of Classification Search
CPC ............. H04W 72/23; H04W 72/0446; H04W 72/1268; H04L 1/1896; H04L 1/08;
(Continued)

(56) References Cited

U.S. PATENT DOCUMENTS 10,904,909 B2 * 1/2021 Cao ....................... H04L 5/0007
11,025,456 B2 * 6/2021 Chatterjee ............. H04L 5/0094
(Continued)

FOREIGN PATENT DOCUMENTS

| CN | 102932920 A | 2/2013 |
|---|---|---|
| CN | 107889231 A | 4/2018 |
| CN | 108513732 A | 9/2018 |

OTHER PUBLICATIONS

Taiwanese Office Action dated Oct. 12, 2022 for Application No. 108134380.
(Continued)

*Primary Examiner* — Jung Liu
(74) *Attorney, Agent, or Firm* — Harness, Dickey & Pierce, P.L.C.

(57) ABSTRACT

A data transmission method and device are provided in embodiments of this disclosure. The method includes: starting to transmit data to a network device on a resource configured in one period; changing an RV value or a resource or a DMRS from a current value to another value in case that a terminal needs to transmit data beyond the boundary of the period.

20 Claims, 17 Drawing Sheets

(58) Field of Classification Search
CPC ... H04L 1/1822; H04L 1/1819; H04L 5/0048; H04L 5/0055; H04L 5/0007; H04L 27/2602; H04L 1/189; H04L 1/0068; H04L 5/0094; H04L 1/1893; H04L 5/0051; H04L 1/00; H04L 5/005
See application file for complete search history.

(56) References Cited

U.S. PATENT DOCUMENTS

| | | | |
|---|---|---|---|
| 2016/0134402 | A1 | 5/2016 | Park et al. |
| 2018/0270853 | A1 | 9/2018 | Hosseini et al. |
| 2019/0230689 | A1* | 7/2019 | Cao ................ H04L 27/2602 |
| 2021/0068084 | A1 | 3/2021 | Zhao |
| 2021/0282137 | A1* | 9/2021 | Wang ................ H04W 72/23 |

OTHER PUBLICATIONS

Japanese Office Action dated May 30, 2022 for Japanese Patent Application No. 2021-517370.
Samsung, "Potential enhancement for UL grant-free transmission", Agenda item 7.2.6.3, 3GPP TSG RAN WG1 Meeting #94, R1-1808789, Aug. 200-24, 2018, Gothenburg, Sweden.
Korean Office Action dated May 30, 2022 for KR Application No. 10-2021-7012742.
Ericsson, "RAN 1 decisions for WI Ultra Reliable Low Latency Communication for LTE (LTE_HRLLC)—per topic", Agenda item 6.2.7, 3GPP TSG RAN WG1 Meeting #93, R1-1807583, May 21-25, 2018, Busan, South Korea.
NTT Docomo, Inc., "Summary of 7.2.6.3 Enhanced UL grant-free transmissions", Agenda item 7.2.6.3, 3GPP TSG RAN WG1 Meeting #94, R1-1809979, Aug. 20-24, 2018, Gothenburg, Sweden.
Chinese Office Action dated Sep. 27, 2020 for Application No. CN 2001811302730.1.
International Search Report and Written Opinion for International Application No. PCT/CN2019/105897 dated Mar. 23, 2021.
Nokia, Nokia Shanghai Bell, "On UL SPS enhancements for URLLC", Agenda item 6.2.8.2, 3GPP TSG-RAN WG1 Meeting #93, R1-1806457, May 21-25, 2018, Busan, Korea.
Huawei, Hisilicon, "Repetition Enhancements for UL SPS Operation", Agenda item 6.2.8.2, 3GPP TSG-RAN WG1 Meeting #93, R1-1805868, May 21-25, 2018, Busan, Korea.
Communication pursuant to Rule 164(1) EPC dated Oct. 14, 2021 in European Application No. 19865657.1.

* cited by examiner

DATA TRANSMISSION METHOD AND DEVICE

CROSS-REFERENCE TO RELATED APPLICATIONS

The present application is the U.S. national phase of PCT Application PCT/CN2019/105897 filed on Sep. 16, 2019, which claims priorities to the Chinese patent application No. 201811143435.6 filed in China on Sep. 28, 2018, the Chinese patent application No. 201811216019.4 filed in China on Oct. 18, 2018 and the Chinese patent application No. 201811302730.1 filed in China on Nov. 2, 2018, disclosures of which are incorporated herein by reference in their entireties.

TECHNICAL FIELD

Embodiments of the present disclosure relate to the field of communication technology, in particular to a data transmission method and device.

BACKGROUND

With the development and evolvement of requirements of mobile communication services, multiple organizations such as the 3$^{rd}$ Generation Partnership Project (3GPP) begin to research a new wireless communication system (i.e., the 5th generation new radio access technology (5G NR)) as the future mobile communication system. In the 5G NR system, there is an important requirement for low latency and high reliability communication. Consequently, transmission schemes such as ultra-reliable & low latency communication (URLLC) emerge. It is relatively easy to meet the low latency requirement alone or to meet the high reliability requirement alone. However, it is difficult to meet the low latency requirement and the high reliability requirement simultaneously, and the requirements are usually met at the cost of complexity.

For URLLC services, an uplink non-scheduled scheme will be supported in NR standards to reduce air interface transmission latency, meanwhile a repeated transmission scheme will be supported to increase reliability.

Since the latency problem cannot be compensated for when it arises, while the reliability problem may be remedied by retransmission within the range of the latency and the like, it is necessary to provide a flexible solution which reaches a compromise between high reliability and high complexity while meeting the requirement on low latency. It may be appreciated, the low latency may be defined as a condition in which a terminal is allowed to transmit a physical uplink shared channel (PUSCH) in each transmission time interval (TTI), and the high reliability may be defined as a condition in which a configured quantity of repetitions is reached.

For URLLC services, the problem that the NR scheme cannot reach a flexible compromise between high reliability and low complexity while ensuring low latency needs to be solved.

SUMMARY

An objective of embodiments of the present disclosure is to provide a data transmission method and a device, to solve the problem that the NR scheme in the related art cannot reach a flexible compromise between high reliability and low complexity while ensuring low latency.

In a first aspect according to some embodiments of the present disclosure, a data transmission method is provided. The method is applied to a terminal and includes: starting to transmit data to a network device on a resource configured in one period; and changing an RV value or a resource or a DMRS from a current value to another value in case that the terminal needs to transmit data beyond a boundary of the period.

Optionally, the method further includes: receiving resource configuration information configured by the network device, wherein the resource configuration information at least includes one or more of: a resource allocation period, a quantity K of repetitions, an RV sequence, resource positions of K transmission occasions in the period, whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period.

Optionally, after the receiving the resource configuration information configured by the network device, the method further includes: determining, according to the resource configuration information, one or more of: the boundary of the period; positions of the K transmission occasions; and an RV value for a repetition at each transmission occasion.

Optionally, after the receiving the resource configuration information configured by the network device, the method further includes: transmitting a first repetition at any one transmission occasion within the period, and in case that there is still a transmission occasion available in the period and a total quantity of repetitions is less than the K, transmitting a subsequent repetition at the transmission occasion.

Optionally, the transmitting the first repetition at any one transmission occasion within the period includes: selecting an earliest transmission occasion within the period to transmit the first repetition, wherein an RV value for the first repetition is equal to a first value in the RV sequence, the first value being 0.

Optionally, the method further includes; judging whether a repetition goes beyond the boundary of the period when the terminal transmits the repetition; and continuing to transmit the repetition according to an RV value in the RV sequence in case that the repetition does not go beyond the boundary of the period and a total quantity of repetitions is less than a quantity K of repetitions, and then continuing to judge whether a subsequent repetition goes beyond the boundary of the period.

Optionally, the method further includes: judging whether a repetition goes beyond the boundary of the period when the terminal transmits the repetition; and terminating repeated transmission in case that the repetition goes beyond the boundary of the period and the network device does not allow the terminal to transmit beyond the boundary of the period.

Optionally, the method further includes: in case that the network device allows the terminal to transmit beyond the boundary of the period, adjusting a repetition transmitted beyond the boundary of the period and having an RV value of 0 to a repetition with other RV value, and leaving a repetition transmitted beyond the boundary of the period and having an RV value other than 0 unchanged; or, in case that the network device allows the terminal to transmit beyond the boundary of the period, assigning an RV value to a repetition transmitted beyond the boundary of the period according to another RV sequence for transmission beyond the boundary of the period.

Optionally, in case that the network device allows the terminal to transmit beyond the boundary of the period, the adjusting a repetition transmitted beyond the boundary of the period and having an RV value of 0 to a repetition with other RV value, and leaving a repetition transmitted beyond the boundary of the period and having an RV value other than 0 unchanged includes: judging whether a repetition goes beyond the boundary of the period when the terminal transmits the repetition; judging whether an RV value in an RV sequence is 0 in case that it is judged that the repetition goes beyond the boundary of the period and the network device allows the terminal to transmit beyond the boundary of the period; and continuing to transmit the repetition according to the RV value in the RV sequence in case that the RV value in the RV sequence is not 0 and a total quantity of repetitions is less than a quantity K of repetitions, and then continuing to judge whether a subsequent repetition goes beyond the boundary of the period.

Optionally, in case that the network device allows the terminal to transmit beyond the boundary of the period, the adjusting a repetition transmitted beyond the boundary of the period and having an RV value of 0 to a repetition with other RV value, and leaving a repetition transmitted beyond the boundary of the period and having an RV value other than 0 unchanged includes: judging whether a repetition goes beyond the boundary of the period when the terminal transmits the repetition; judging whether an RV value in the RV sequence is 0 in case that it is judged that the repetition goes beyond the boundary of the period and the network device allows the terminal to transmit beyond the boundary of the period; and transmitting the repetition according to another RV value in case that the RV value in the RV sequence is 0 and a total quantity of repetitions is less than a quantity K of repetitions, and then continuing to judge whether a subsequent repetition goes beyond the boundary of the period.

Optionally, the method further includes: assigning a value to a DMRS for a repetition transmitted beyond the boundary of the period according to another DMRS for transmission beyond the boundary of the period in case that the network device allows the terminal to transmit beyond the boundary of the period, wherein the another DMRS is another antenna port, or another configuration parameter of the DMRS, or another parameter in a process of generating the DMRS.

In a second aspect according to some embodiments of the present disclosure, a data transmission method is provided. The method is applied to a network device, and includes: transmitting resource configuration information to a terminal, wherein the resource configuration information at least includes one or more of: a resource allocation period, a quantity of repetitions, an RV sequence, positions of a first quantity of resources in the period, whether the network device allow the terminal to transmit beyond the boundary of the period, another RV sequence for transmission beyond the boundary of the period, another DMRS for transmission beyond the boundary of the period; wherein the first quantity is equal to the quantity of repetitions.

In a third aspect according to some embodiments of the present disclosure, a terminal is provided. The terminal includes: a first transceiver and a first processor, wherein, the first transceiver is configured to start to transmit data to a network device on a resource configured in one period; and the first processor is configured to change an RV value or a resource or a DMRS from a current value to another value in case that the terminal needs to transmit data beyond a boundary of the period.

In a fourth aspect according to some embodiments of the present disclosure, a network device is provided. The network device includes: a second transceiver and a second processor, wherein, the second transceiver is configured to transmit resource configuration information to a terminal, wherein the resource configuration information at least includes one or more of: a resource allocation period, a quantity of repetitions, an RV sequence, positions of a first quantity of resources in the period, whether the network device allow the terminal to transmit beyond the boundary of the period, another RV sequence for transmission beyond the boundary of the period, another DMRS for transmission beyond the boundary of the period; wherein the first quantity is equal to the quantity of repetitions.

In a fifth aspect according to some embodiments of the present disclosure, a terminal is provided. The terminal includes: a first transmission module, configured to start to transmit data to a network device on a resource configured in one period; and an adjustment module, configured to change an RV value or a resource or a DMRS from a current value to another value in case that the terminal needs to transmit data beyond a boundary of the period.

In a sixth aspect according to some embodiments of the present disclosure, a network device is provided. The network device includes: a second transmission module, configured to transmit resource configuration information to a terminal, wherein the resource configuration information at least includes one or more of: a resource allocation period, a quantity of repetitions, an RV sequence, positions of a first quantity of resources in the period, whether the network device allow the terminal to transmit beyond the boundary of the period, another RV sequence for transmission beyond the boundary of the period, another DMRS for transmission beyond the boundary of the period; wherein the first quantity is equal to the quantity of repetitions.

In a seventh aspect according to some embodiments of the present disclosure, a terminal is provided. The terminal includes: a processor, a storage and a program stored in the storage and configured to be executed by the processor, wherein the processor is configured to execute the program to implement the steps of the data transmission method as described in the first aspect.

In an eighth aspect according to some embodiments of the present disclosure, a network device is provided. The network device includes: a processor, a storage and a program stored in the storage and configured to be executed by the processor, wherein the processor is configured to execute the program to implement the steps of the data transmission method as described in the second aspect.

In a ninth aspect according to some embodiments of the present disclosure, a computer readable storage medium storing therein a computer program is provided, wherein the computer program is configured to be executed by a processor, to implement the steps of the data transmission method as described in the first aspect, or implement the steps of the data transmission method as described in the second aspect.

In some embodiments of the present disclosure, a flexible compromise between high reliability and low complexity may be reached while ensuring low latency.

BRIEF DESCRIPTION OF THE DRAWINGS

A person of ordinary skill in the art would clearly understand various advantages and benefits of the embodiments of present disclosure by reading detail description of optional implementations set forth below. The drawings are only for the purpose of illustrating the optional implementations, rather than a limitation on the present disclosure. Same reference characters designate same parts throughout the drawings. In the drawings:

FIG. 12 is a seventh schematic diagram of an application scenario of a data transmission method according to some embodiments of the present disclosure;

FIG. 13 is an eighth schematic diagram of an application scenario of a data transmission method according to some embodiments of the present disclosure;

FIG. 16 is an eleventh schematic diagram of an application scenario of a data transmission method according to some embodiments of the present disclosure;

FIG. 20 is a fifteenth schematic diagram of an application scenario of a data transmission method according to some embodiments of the present disclosure;

FIG. 22 is a seventeenth schematic diagram of an application scenario of a data transmission method according to some embodiments of the present disclosure;

DETAILED DESCRIPTION

The following describes clearly and completely the technical solutions according to the embodiments of the present disclosure with reference to the accompanying drawings in the embodiments of the present disclosure. It is apparent the embodiments in the following description are merely a part rather than all of the embodiments of the present disclosure. All other embodiments obtained by a person of ordinary skill in the art based on the embodiments of the present disclosure without creative efforts shall fall within the scope of the present disclosure.

It is noted that term "include" and any variations thereof in the description and claims of the present application are intended to cover a non-exclusive inclusion, such that a process, a method, a system, a product, or a device that includes a list of steps or units not only includes the list of steps or units, but also may include other steps or units not expressly listed or include steps or units inherent in the process, the method, the system, the product, or the device. Moreover, the term "and/or" in the description and the claims is used to represent at least one of associated objects. For example, A and/or B may represent: only A exists, only B exists, and both A and B exist.

In embodiments of the present disclosure, the word "exemplary" or "for example" or the like is used for meaning examples, example illustration or illustration. Any embodiment or design solution described as "exemplary" or "for example" in the embodiments of the present application should not be construed as be more preferred or advantageous than other embodiments or design solutions. To be specific, the word "exemplary" or "for example" or the like is intended to present related concepts in a specific manner.

Figure 1:
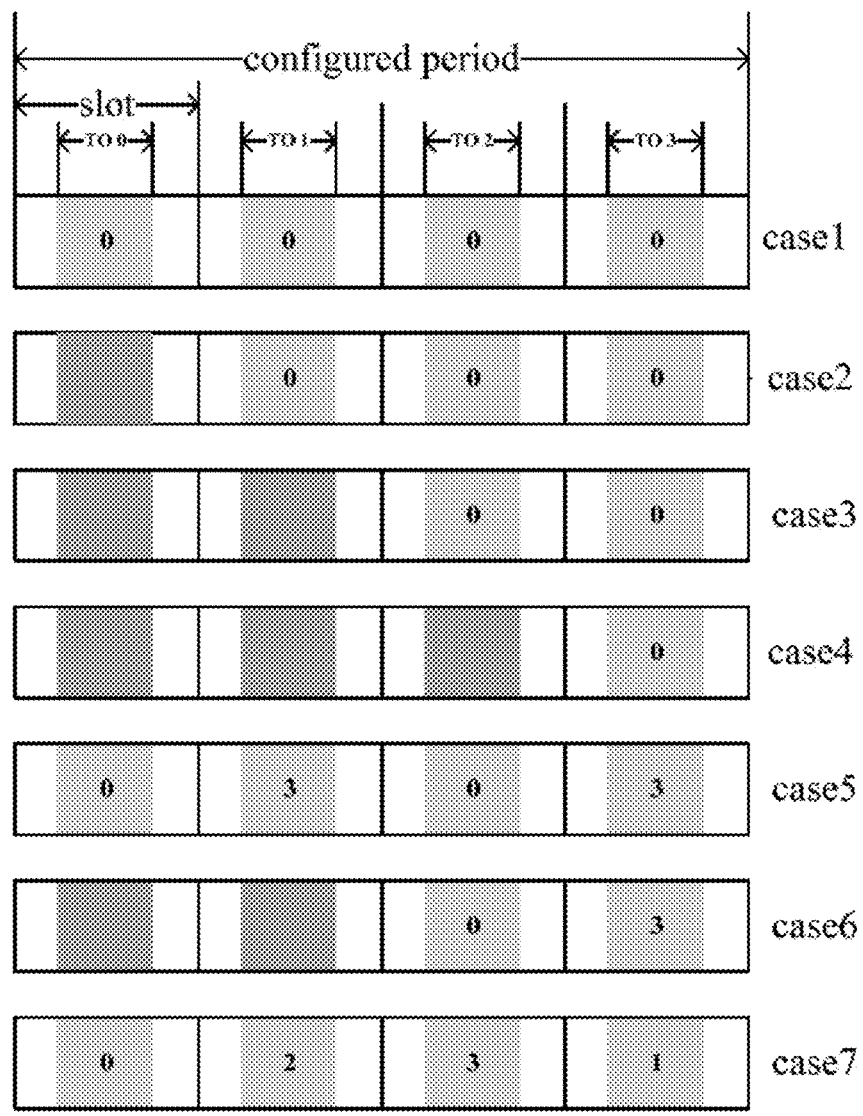
FIG. 1 is a schematic diagram of an application scenario of a data transmission method in the related art.

Referring to FIG. 1 and table 1, in an NR URLLC scheme, at first a base station (gNB) configures PUSCH transmission via signaling, and the configured information includes: a resource allocation period P, a quantity K of repetitions, an RV sequence, resource positions of K repetitions in the period P and the like. The resource positions of K repetitions are K transmission opportunities (TO).

Table 1 represents transmission schemes corresponding to different configured quantities K of repetitions and different RV configurations for the URLLC uplink non-scheduled transmission.

TABLE 1

| | RV = {0 0 0 0} | RV = {0 3 0 3} | RV = {0 2 3 1} |
|---|---|---|---|
| K = 1 | {0} | {0} | {0} |
| K = 2 | {0 0} if start from $1^{st}$ TO<br>{0} if start from $2^{nd}$ TO | {0 3} always start from $1^{st}$ TO | {0 2} always start from $1^{st}$ TO |
| K = 4 | {0 0 0 0} if start from $1^{st}$ TO<br>{0 0 0} if start from $2^{nd}$ TO<br>{0 0} if start from $3^{rd}$ TO<br>{0} if start from $4^{th}$ TO | {0 3 0 3} if start from $1^{st}$ TO<br>{0 3} if start from $3^{rd}$ TO | {0 2 3 1} always start from $1^{st}$ TO |
| K = 8 | {0 0 0 0 0 0 0 0} if start from $1^{st}$ TO<br>{0 0 0 0 0 0 0} if start from $2^{nd}$ TO<br>{0 0 0 0 0 0} if start from $3^{rd}$ TO<br>{0 0 0 0 0} if start from $4^{th}$ TO<br>{0 0 0 0} if start from $5^{th}$ TO<br>{0 0 0} if start from $6^{th}$ TO<br>{0 0} if start from $7^{th}$ TO | {0 3 0 3 0 3} if start from $1^{st}$ TO<br>{0 3 0 3 0} if start from $3^{rd}$ TO<br>{0 3 0 3} if start from $5^{th}$ TO<br>{0 3} if start from $7^{th}$ TO | {0 2 3 1 0 2 3 1} always start from $1^{st}$ TO |

According to conventional standards, configuration is performed through radio resource control (RRC), e.g., P=4, K=4, RV={0 0 0 0}, and the time domain resource position being {a starting orthogonal frequency division multiplexing (OFDM) symbol, a quantity of OFDM symbols}. The time domain resource position is defined as one TO for completing a single repetition. K=4 means four repetitions are to be transmitted which require four TOs. When data arrives before the first TO, the first TO may be used for transmission, in this case, the data is transmitted four times and RV is {0 0 0 0}; when data arrives after the first TO and before the second TO, the second TO may be used for transmission, in this case, the data is transmitted three times and RV is {0 0 0}; when data arrives after the second TO and before the third TO, the third TO may be used for transmission, in this case, the data is transmitted twice and RV is {0 0}; when data arrives after the third TO and before the fourth TO, the fourth TO may be used for transmission, in this case, the data is transmitted once and RV is {0}, which correspond to case 1, case 2, case 3, and case 4 in FIG. 1 respectively.

According to conventional standards, configuration is performed through radio resource control (RRC), e.g., P=4, K=4, RV={0 3 0 3}, and the time domain resource position being {a starting OFDM symbol, a quantity of OFDM symbols}. The time domain resource position is defined as one TO for completing a single repetition. K=4 means four repetitions are to be transmitted which require four TOs. When data arrives before the first TO, the first TO may be used for transmission, in this case, the data is transmitted four times and RV is {0 3 0 3}; when data arrives after the first TO and before the third TO, the third TO may be used for transmission, in this case, the data is transmitted twice and RV is {0 3}; when data arrives after the third TO, the data is not transmitted in the current period and the transmission is postponed to a next period, which correspond to case 5, and case 6 in FIG. 1 respectively.

According to conventional standards, configuration is performed through radio resource control (RRC), e.g., P=4, K=4, RV={0 2 3 1}, and the time domain resource position being {a starting OFDM symbol, a quantity of OFDM symbols}. The time domain resource position is defined as one TO for completing a single repetition. K=4 means four repetitions are to be transmitted which require four TOs. When data arrives before the first TO, the first TO may be used for transmission, in this case, the data is transmitted four times and RV is {0 2 3 1}; when data arrives after the first TO, the data is not transmitted in the current period and the transmission is postponed to a next period, which corresponds to case 7 in FIG. 1.

In conventional NR URLLC schemes, only RV={0 0 0 0} can ensure latency performance, in other words, a terminal is allowed to transmit a PUSCH in each TTI. RV={0 3 0 3} cannot ensure latency performance, for example, when data arrives after TO 0 and before TO 1, the terminal cannot start to transmit the PUSCH from TO 1, instead, the terminal must start to transmit the PUSCH from TO 2 according to the definition of the standards. RV={0 2 3 1} cannot ensure latency performance, for example, when data arrives after TO 0, the terminal has to start to transmit the PUSCH from the next period.

In conventional NR URLLC schemes, both RV={0 0 0 0} and RV={0 3 0 3} cannot ensure reliability since the configured quantity of repetitions cannot be reached. RV={0 2 3 1} can ensure reliability since the configured quantity of repetitions can be reached.

Thus, in conventional NR URLLC schemes, a flexible compromise between high reliability and low complexity cannot be achieved while ensuring low latency.

Some embodiments of the present disclosure are described hereinafter with reference to the accompanying drawings. The data transmission method and device provided in some embodiments of the present disclosure are applicable to a wireless communication system. The wireless communication system may be a 5G system, an evolved long term evolution (eLTE) system or a follow-up evolved communication system.

Figure 2:
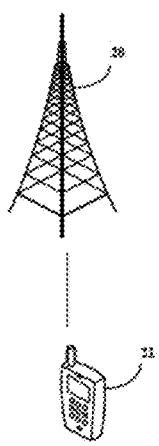
FIG. 2 is a schematic diagram of an architecture of a wireless communication system according to some embodiments of the present disclosure.

Referring to FIG. 2, a schematic diagram of an architecture of a wireless communication system according to some embodiments of the present disclosure is illustrated. As shown in FIG. 2, the wireless communication system may include: a network device 20 and a terminal. For example, the terminal is designated as UE 21. The UE 21 may communicate with the network device 20 (transmit signaling or data). In practical applications, the connection between the various devices may be a wireless connection. In order to show the connection relationship between the devices in an intuitive manner, the connection is represented by a solid line in FIG. 2.

It is noted, the communication system may include a plurality of UE 21, and the network device may communicate with the plurality of UE 21.

The network device 20 according to some embodiments of the present disclosure may be a base station. The base station may be a commonly used base station, an evolved node base station (eNB), a network device in a 5G system (e.g., next generation node base station (gNB)), a transmission and reception point (TRP), or the like.

The terminal according to some embodiments of the present disclosure may be a handset, tablet computer, notebook computer, ultra-mobile personal computer (UMPC), netbook, personal digital assistant (PDA) or the like.

Figure 3:
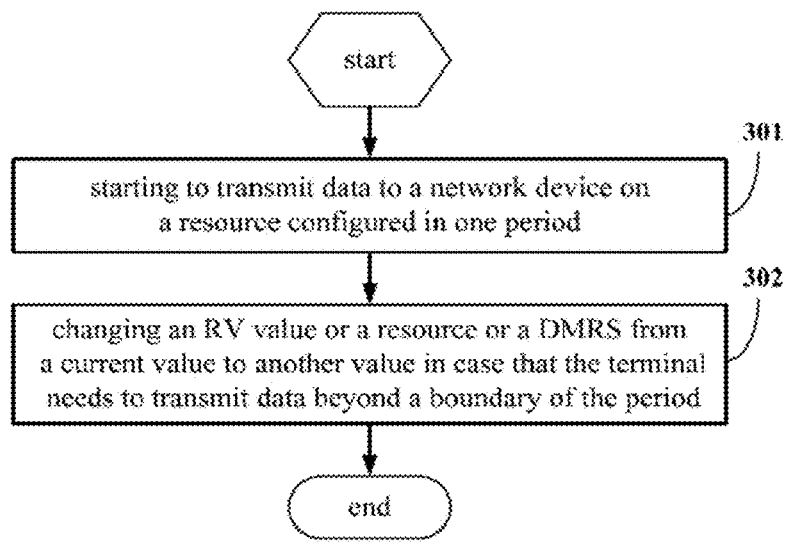
FIG. 3 is a first flow diagram of a data transmission method according to some embodiments of the present disclosure.

Referring to FIG. 3, some embodiments of the present disclosure provide a data transmission method. The method is performed by a terminal and includes the following specific steps:

step 301: starting to transmit data to a network device on a resource configured in one period;

step 302: changing an RV value or a resource or a DMRS from a current value to another value in case that the terminal needs to transmit data beyond a boundary of the period.

For example, the current value may be 0, and the another value may be 1, 2 or 3. In other words, when the terminal needs to transmit data beyond the boundary of the period, the RV value is changed from 0 to 1, 2 or 3.

Optionally, in some embodiments of the present disclosure, the method may further include: receiving resource configuration information configured by the network device.

In some embodiments of the present disclosure, the resource configuration information at least includes one or more of: a resource allocation period P, a quantity K of repetitions, an RV sequence, resource positions of K transmission occasions (TO) in the period P, information as to whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period.

For example, P≥K, K={2, 4, 8}, and the RV sequence may be {0 0 0 0}, {0 3 0 3} or {0 2 3 1}. When K=2, only first two values in the RV sequence are used; and when K=8, the four values in the RV sequence are used cyclically.

In some embodiments of the present disclosure, optionally, after the receiving the resource configuration information configured by the network device, the method further includes: determining, according to the resource configuration information, one or more of: the boundary of the period; positions of the K transmission occasions; and an RV value for a repetition at each transmission occasion.

In some embodiments of the present disclosure, optionally, after the receiving the resource configuration information configured by the network device, the method further includes: transmitting a first repetition at any one transmission occasion within the period, and in case that there is still a transmission occasion available in the period and a total quantity of repetitions is less than the quantity K of repetitions, transmitting a subsequent repetition at the transmission occasion. Further, if the total quantity of repetitions reaches the K, the repeated transmission is terminated.

Optionally, the any one transmission occasion may be a transmission occasion in the period that allows the first repetition to be transmitted.

In some embodiments of the present disclosure, optionally, the transmitting the first repetition at any one transmission occasion within the period includes: selecting an earliest transmission occasion within the period to transmit the first repetition, wherein an RV value for the first repetition is equal to a first value in the RV sequence, the first value being 0.

In some embodiments of the present disclosure, optionally, the method further includes: judging whether a repetition goes beyond the boundary of the period when the terminal transmits the repetition; and continuing to transmit the repetition according to an RV value in the RV sequence in case that the repetition does not go beyond the boundary of the period and a total quantity of repetitions is less than the quantity K of repetitions, and then continuing to judge whether a subsequent repetition goes beyond the boundary of the period.

In some embodiments of the present disclosure, optionally, the method further includes: judging whether a repetition goes beyond the boundary of the period when the terminal transmits the repetition; and terminating repeated transmission in case that the repetition goes beyond the boundary of the period and the network device does not allow the terminal to transmit beyond the boundary of the period.

In some embodiments of the present disclosure, optionally, the method further includes: in case that the network device allows the terminal to transmit beyond the boundary of the period, adjusting a repetition transmitted beyond the boundary of the period and having an RV value of 0 to a repetition with other RV value, and leaving a repetition transmitted beyond the boundary of the period and having an RV value other than 0 unchanged; or, in case that the network device allows the terminal to transmit beyond the boundary of the period, assigning an RV value to a repetition transmitted beyond the boundary of the period according to another RV sequence for transmission beyond the boundary of the period.

In some embodiments of the present disclosure, optionally, in case that the network device allows the terminal to transmit beyond the boundary of the period, the adjusting a repetition transmitted beyond the boundary of the period and having an RV value of 0 to a repetition with other RV value, and leaving a repetition transmitted beyond the boundary of the period and having an RV value other than 0 unchanged includes: judging whether a repetition goes beyond the boundary of the period when the terminal transmits the repetition; judging whether an RV value in an RV sequence is 0 in case that it is judged that the repetition goes beyond the boundary of the period and the network device allows the terminal to transmit beyond the boundary of the period; and continuing to transmit the repetition according to the RV value in the RV sequence in case that the RV value in the RV sequence is not 0 and a total quantity of repetitions is less than a quantity K of repetitions, and then continuing to judge whether a subsequent repetition goes beyond the boundary of the period.

In some embodiments of the present disclosure, optionally, in case that the network device allows the terminal to transmit beyond the boundary of the period, the adjusting a repetition transmitted beyond the boundary of the period and having an RV value of 0 to a repetition with other RV value, and leaving a repetition transmitted beyond the boundary of the period and having an RV value other than 0 unchanged includes: judging whether a repetition goes beyond the boundary of the period when the terminal transmits the repetition; judging whether an RV value in the RV sequence is 0 in case that it is judged that the repetition goes beyond the boundary of the period and the network device allows the terminal to transmit beyond the boundary of the period; and transmitting the repetition according to another RV value in case that the RV value in the RV sequence is 0 and a total quantity of repetitions is less than the quantity K of repetitions, and then continuing to judge whether a subsequent repetition goes beyond the boundary of the period.

In some embodiments of the present disclosure, optionally, the method further includes: assigning a value to a DMRS for a repetition transmitted beyond the boundary of the period according to another DMRS for transmission beyond the boundary of the period in case that the network device allows the terminal to transmit beyond the boundary of the period, wherein the another DMRS may be another antenna port, or another configuration parameter of the DMRS, or another parameter in a process of generating the DMRS.

In some embodiments of the present disclosure, the terminal performs communication according to resources configured by the network device, so as to reach a compromise between high reliability and high complexity while ensuring low latency.

Figure 4:
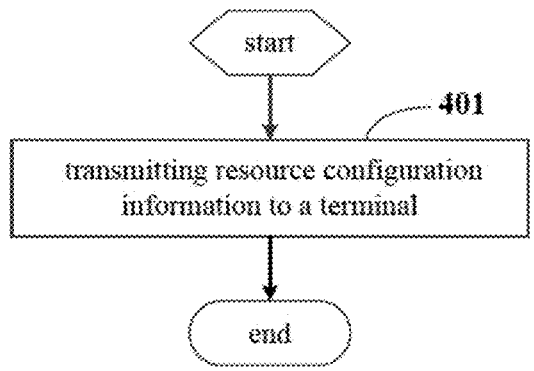
FIG. 4 is a second flow diagram of a data transmission method according to some embodiments of the present disclosure.

Referring to FIG. 4, some embodiments of the present disclosure provide another resource configuration method. The method is performed by a network device and includes the following specific step:

step 401: transmitting resource configuration information to a terminal.

In some embodiments of the present disclosure, the resource configuration information at least includes one or more of: a resource allocation period P, a quantity K of repetitions, an RV sequence, resource positions of K transmission occasions (TO) in the period P, information as to whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period. The quantity K of repetitions is equivalent to a maximum quantity of repetitions.

For example, P≥K, K={2, 4, 8}, and the RV sequence may be {0 0 0 0}, {0 3 0 3} or {0 2 3 1}. When K=2, only first two values in the RV sequence are used; and when K=8, the four values in the RV sequence are used cyclically.

In some embodiments of the present disclosure, the terminal performs communication according to resources configured by the network device, so as to reach a compromise between high reliability and high complexity while ensuring low latency.

Figure 5:
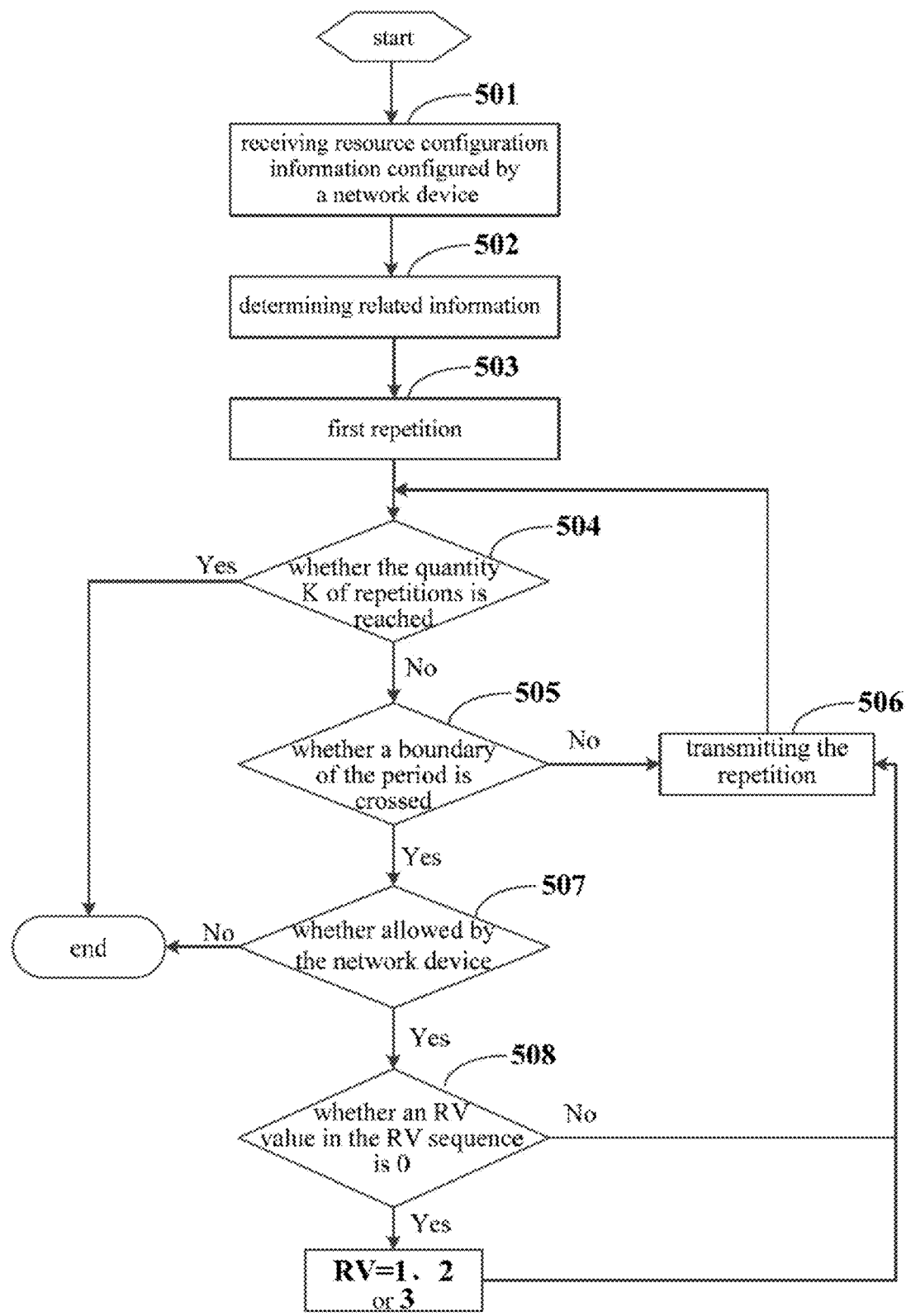
FIG. 5 is a third flow diagram of a data transmission method according to some embodiments of the present disclosure.

Referring to FIG. 5, some embodiments of the present disclosure provide a data transmission method. The method is performed by a terminal and includes the specific steps 501 to 508.

Step 501: receiving resource configuration information configured by a network device.

In some embodiments of the present disclosure, the resource configuration information at least includes one or more of: a resource allocation period P, a quantity K of repetitions, an RV sequence, resource positions of K transmission occasions (TO) in the period P, information as to whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period.

For example, P≥K, K={2, 4, 8}, and the RV sequence may be {0 0 0 0}, {0 3 0 3} or {0 2 3 1}. When K=2, only first two values in the RV sequence are used; and when K=8, the four values in the RV sequence are used cyclically.

Step 502: determining, by the terminal, related information according to the resource configuration information.

In some embodiments of the present disclosure, the terminal determines, according to the resource configuration information, one or more of: the boundary of the period; positions of the K transmission occasions (TO); and an RV value for a repetition at each transmission occasion (TO).

Step 503: transmitting, by the terminal, a first repetition.

In some embodiments of the present disclosure, the terminal transmits the first repetition at any one transmission occasion within the period. Optionally, the terminal transmits the first repetition at an earliest TO (or referred to as the first TO), wherein an RV value for the first repetition is equal to a first value in the RV sequence, the first value being 0.

Further, in case that there is still a transmission occasion available in the period and a total quantity of repetitions is less than the K, the terminal transmits a subsequent repetition at the transmission occasion.

Step 504: judging whether the quantity K of repetitions is reached; if reached, terminating the repeated transmission, otherwise, proceeding to step 505.

In some embodiments of the present disclosure, that the quantity K of repetitions is not reached demonstrates that there is still TO in the period, then the terminal transmits the repetition at the transmission occasion.

Step 505: judging, by the terminal, whether a repetition goes beyond the boundary of the period; if so, proceeding to step 507, otherwise, proceeding to step 506.

In some embodiments of the present disclosure, before transmitting a next repetition, the terminal judges whether the next repetition goes beyond the boundary of the period.

Step 506: transmitting, by the terminal, the repetition, and then performing the step 504 again.

In some embodiments of the present disclosure, the terminal transmits the repetition according to an RV value in the RV sequence and then continues to judge whether the quantity K of repetitions is reached when a subsequent repetition is transmitted.

Step 507: judging, by the terminal, whether the network device allow the terminal to transmit beyond the boundary of the period; if so, proceeding to step 508, otherwise, terminating the repeated transmission.

In some embodiments of the present disclosure, if the repetition goes beyond the boundary of the period and the network device does not allow the terminal to transmit beyond the boundary of the period, the terminal terminates the repeated transmission.

Step 508: judging, by the terminal, whether an RV value for the current repetition in the RV sequence is 0; if so, transmitting the repetition with other RV value (e.g., 1, 2 or 3), and then performing step 506 again, otherwise, performing step 506 again.

In some embodiments of the present disclosure, in case that a repetition goes beyond the boundary of the period, the network device allows the terminal to transmit beyond the boundary of the period, and the RV value is not 0, the terminal transmits the repetition according to the RV value in the RV sequence, and then judges whether a next repetition goes beyond the boundary of the period when transmitting the next repetition. In case that a repetition goes beyond the boundary of the period, the network device allows the terminal to transmit beyond the boundary of the period, and the RV value is 0, the terminal transmits the repetition according to RV=1, 2 or 3, and then judges whether a next repetition goes beyond the boundary of the period when transmitting the next repetition.

In some embodiments of the present disclosure, the terminal performs communication according to resources configured by the network device, so as to reach a compromise between high reliability and high complexity while ensuring low latency.

The methods according to some embodiments of the present disclosure are described hereinafter with reference to specific examples 1 to 19.

Example 1

Figure 6:
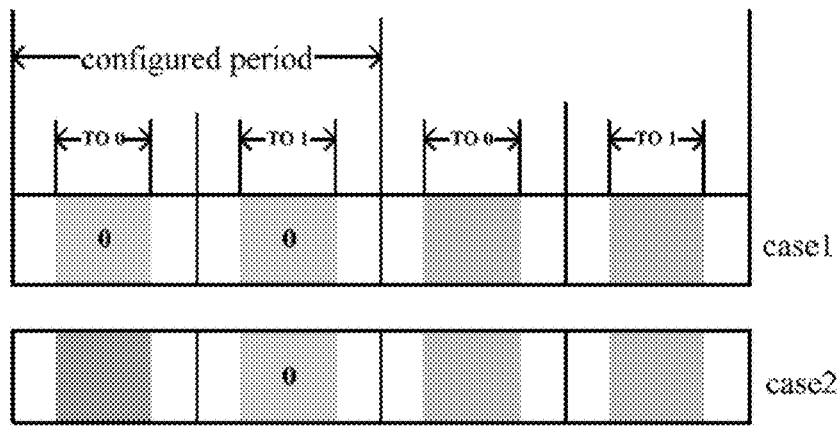
FIG. 6 is a first schematic diagram of an application scenario of a data transmission method according to some embodiments of the present disclosure.

Referring to FIG. 6, according to conventional standards, configuration is performed through RRC, e.g., P=2, K=2, RV={0 0 0 0}, and the time domain resource position being {a starting OFDM symbol, a quantity of OFDM symbols}. The time domain resource position is defined as one TO for completing a single repetition. K=2 means two repetitions are to be transmitted which require two TOs. When data arrives before the first TO, the first TO and the second TO may be used for performing transmission twice, which is the case 1 in FIG. 6; when data arrives before the second TO, the second TO may be used for transmitting the first repetition, if the base station does not allow the terminal to transmit beyond the boundary of the period, or just does not allow the terminal to transmit beyond the boundary of the period with the RV value of the repetition changed from 0 to 3, the repeated transmission is terminated, that is, a total of one repetition is transmitted, which is case 2 in FIG. 6.

Example 2

Figure 7:
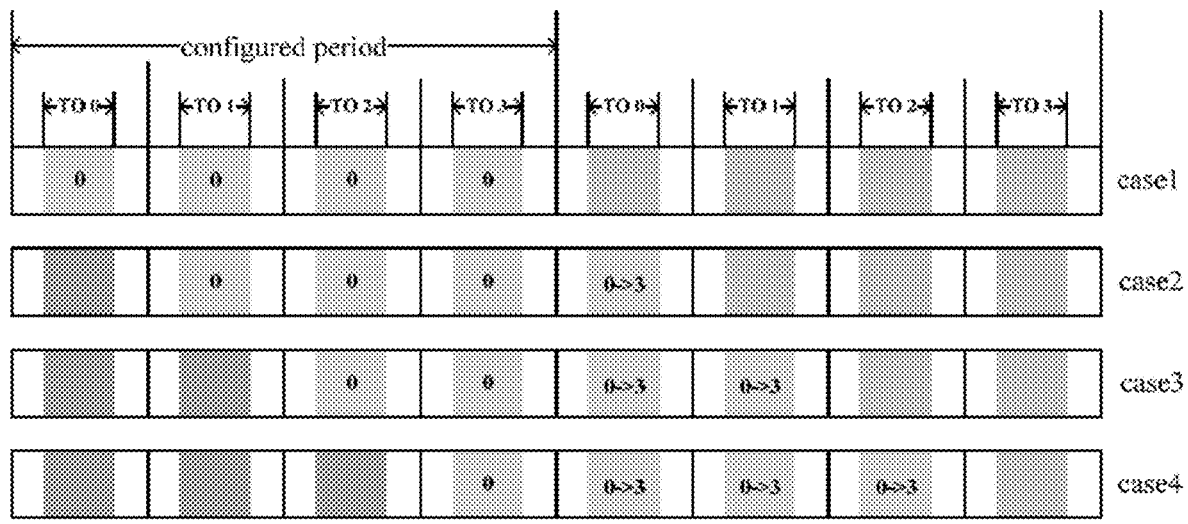
FIG. 7 is a second schematic diagram of an application scenario of a data transmission method according to some embodiments of the present disclosure.

Referring to FIG. 7, according to conventional standards, configuration is performed through RRC, e.g., P=4, K=4, RV={0 0 0 0}, and the time domain resource position being {a starting OFDM symbol, a quantity of OFDM symbols}. The time domain resource position is defined as one TO for completing a single repetition. K=4 means four repetitions are to be transmitted which require four TOs. When data arrives before the first TO, the first TO to the fourth TO may be used for performing transmission four times, which is the case 1 in FIG. 7; when data arrives before the second TO, the second TO may be used for transmitting the first repetition, if the base station allows the terminal to transmit beyond the boundary of the period and allows the terminal to transmit beyond the boundary of the period with the RV value of the repetition changed from 0 to 3, four repetitions are transmitted before the repeated transmission is terminated, which is case 2 in FIG. 7, wherein the RV for the repetition beyond the boundary of the period is changed from 0 to 3; when data arrives before the third TO, the third TO may be used for transmitting the first repetition, if the base station allows the terminal to transmit beyond the boundary of the period and allows the terminal to transmit beyond the boundary of the period with the RV value of the repetition changed from 0 to 3, four repetitions are transmitted before the repeated transmission is terminated, which is case 3 in FIG. 7, wherein the RVs for the repetitions beyond the boundary of the period are changed from 0 to 3; when data arrives before the fourth TO, the fourth TO may be used for transmitting the first repetition, if the base station allows the terminal to transmit beyond the boundary of the period and allows the terminal to transmit beyond the boundary of the period with the RV value of the repetition changed from 0 to 3, four repetitions are transmitted before the repeated transmission is terminated, which is case 4 in FIG. 7, wherein the RVs for the repetitions beyond the boundary of the period are changed from 0 to 3.

Example 3

Figure 8:
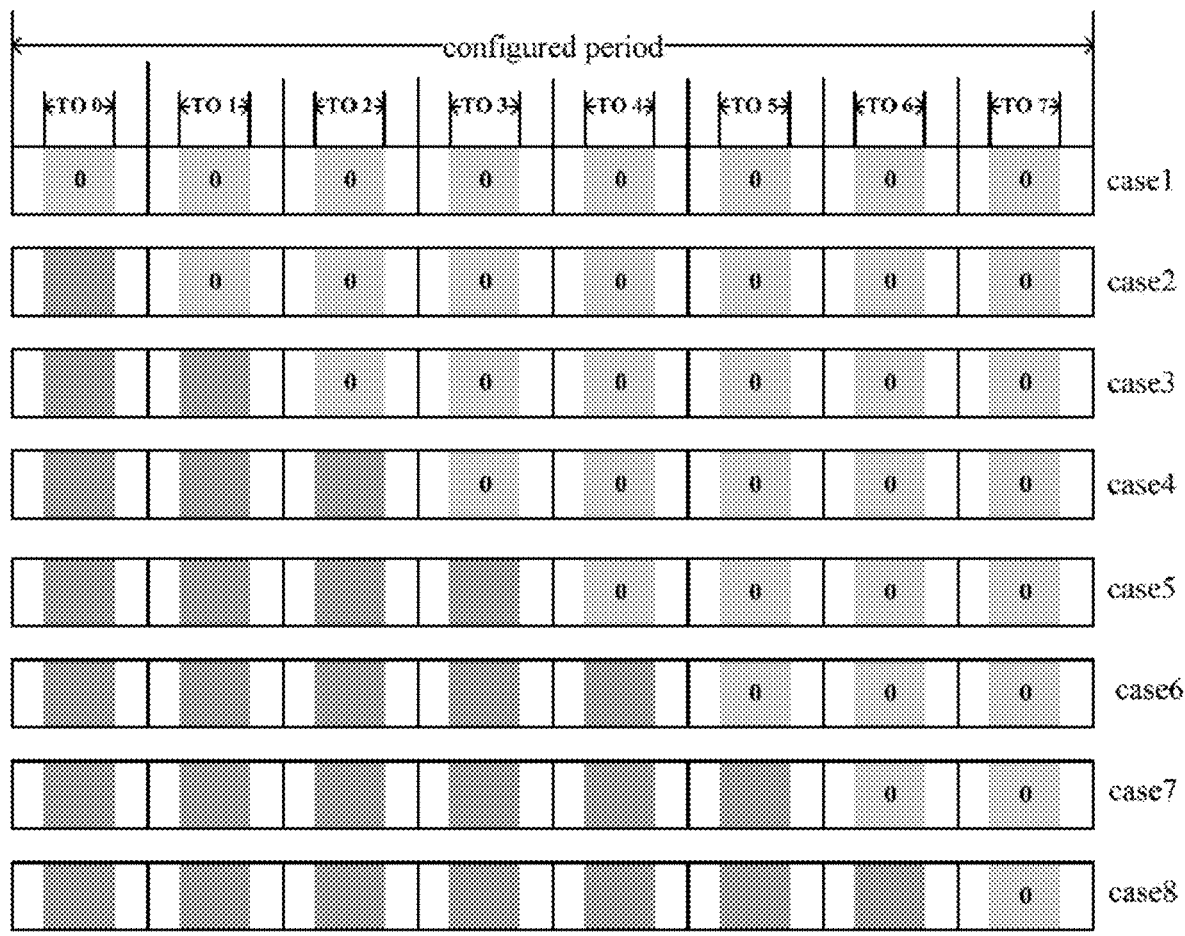
FIG. 8 is a third schematic diagram of an application scenario of a data transmission method according to some embodiments of the present disclosure.

Referring to FIG. 8, according to conventional standards, configuration is performed through RRC, e.g., P=8, K=8, RV={0 0 0 0}, and the time domain resource position being {a starting OFDM symbol, a quantity of OFDM symbols}. The time domain resource position is defined as one TO for completing a single repetition. K=8 means eight repetitions are to be transmitted which require eight TOs. When data arrives before the first TO, the first TO to the eighth TO may be used for performing transmission eight times, which is the case 1 in FIG. 8; when data arrives before the second TO, the second TO may be used for transmitting the first repetition, if the base station does not allow the terminal to transmit beyond the boundary of the period, or just does not allow the terminal to transmit beyond the boundary of the period with the RV value of the repetition changed from 0 to 3, seven repetitions are transmitted before the repeated transmission is terminated, which is case 2 in FIG. 8; the remaining case can be done in a similar fashion; when data arrives before the eighth TO, the eighth TO may be used for transmitting the first repetition, if the base station does not allow the terminal to transmit beyond the boundary of the period, or just does not allow the terminal to transmit beyond the boundary of the period with the RV value of the repetition changed from 0 to 3, one repetition is transmitted before the repeated transmission is terminated, which is case 8 in FIG. 8.

Example 4

Figure 9:
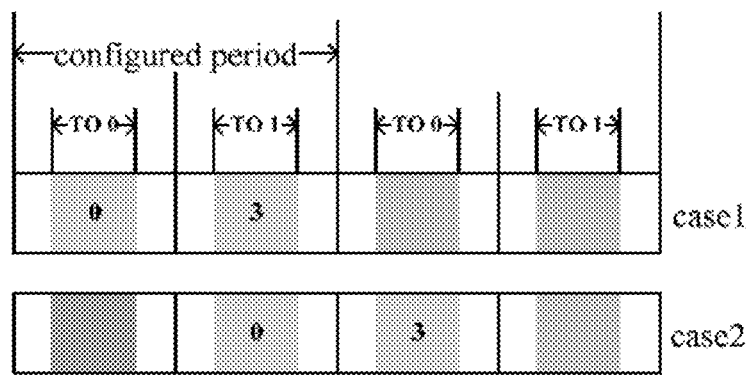
FIG. 9 is a fourth schematic diagram of an application scenario of a data transmission method according to some embodiments of the present disclosure.

Referring to FIG. 9, according to conventional standards, configuration is performed through RRC, e.g., P=2, K=2, RV={0 3 0 3}, and the time domain resource position being {a starting OFDM symbol, a quantity of OFDM symbols}. The time domain resource position is defined as one TO for completing a single repetition. K=2 means two repetitions are to be transmitted which require two TOs. When data arrives before the first TO, the first TO and the second TO may be used for performing transmission twice, which is the case 1 in FIG. 9; when data arrives before the second TO, the second TO may be used for transmitting the first repetition, if the base station allows the terminal to transmit beyond the boundary of the period, two repetitions are transmitted before the repeated transmission is terminated, which is case 2 in FIG. 9.

Example 5

Figure 10:
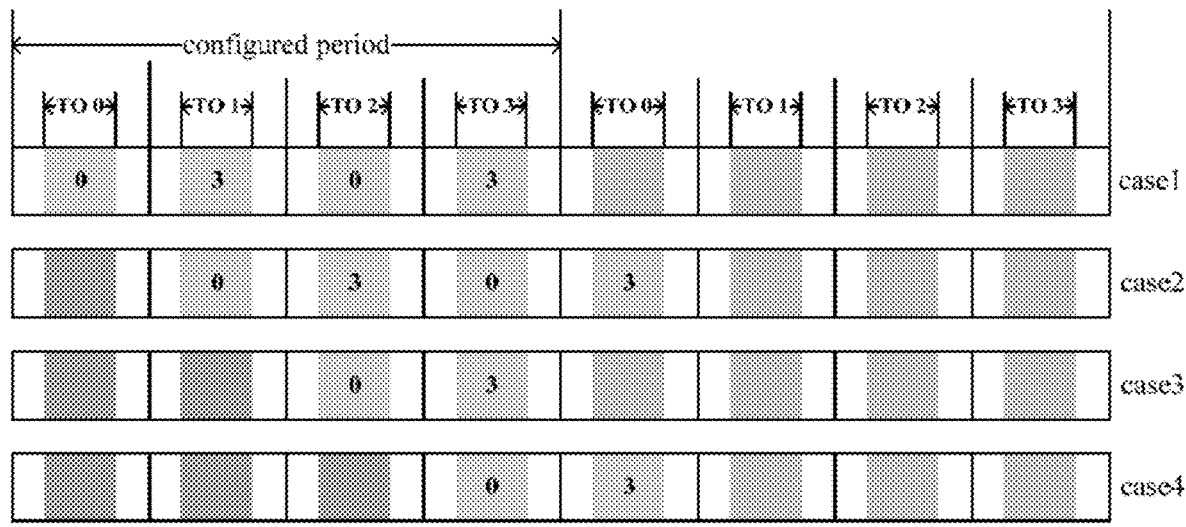
FIG. 10 is a fifth schematic diagram of an application scenario of a data transmission method according to some embodiments of the present disclosure.

Referring to FIG. 10, according to conventional standards, configuration is performed through RRC, e.g., P=4, K=4, RV={0 3 0 3}, and the time domain resource position being {a starting OFDM symbol, a quantity of OFDM symbols}. The time domain resource position is defined as one TO for completing a single repetition. K=4 means four repetitions are to be transmitted which require four TOs. When data arrives before the first TO, the first TO to the fourth TO may be used for performing transmission four times, which is case 1 in FIG. 10; when data arrives before the second TO, the second TO may be used for transmitting the first repetition, if the base station allows the terminal to transmit beyond the boundary of the period, four repetitions are transmitted before the repeated transmission is terminated, which is case 2 in FIG. 10; when data arrives before the third TO, the third TO may be used for transmitting the first repetition, if the base station allows the terminal to transmit beyond the boundary of the period, but does not allow the terminal to transmit beyond the boundary of the period with the RV value of the repetition changed from 0 to 3, two repetitions are transmitted before the repeated transmission is terminated, which is case 3 in FIG. 10; when data arrives before the fourth TO, the fourth TO may be used for transmitting the first repetition, if the base station allows the terminal to transmit beyond the boundary of the period, but does not allow the terminal to transmit beyond the boundary of the period with the RV value of the repetition changed from 0 to 3, two repetitions are transmitted before the repeated transmission is terminated, which is case 4 in FIG. 10.

Example 6

Figure 11:
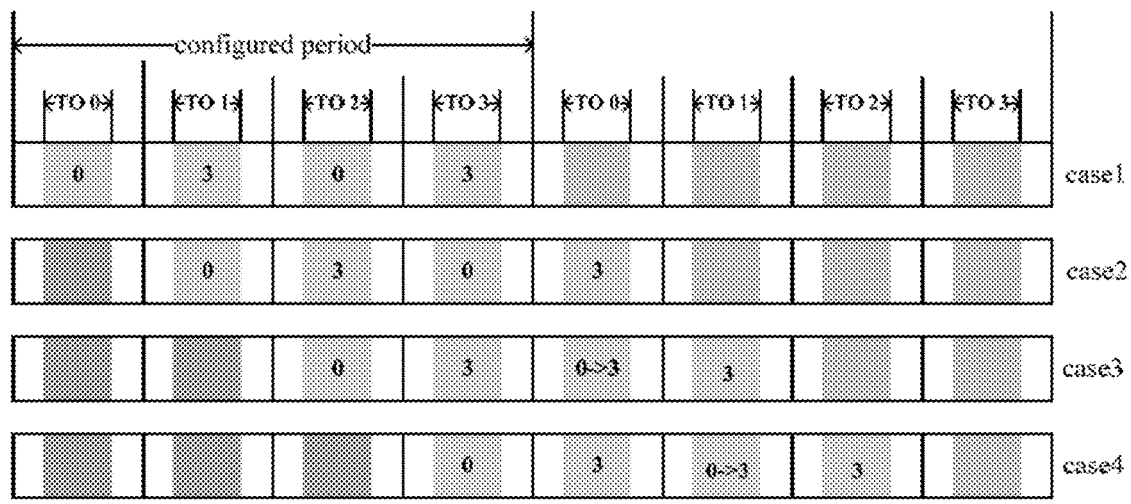
FIG. 11 is a sixth schematic diagram of an application scenario of a data transmission method according to some embodiments of the present disclosure.

Referring to FIG. 11, according to conventional standards, configuration is performed through RRC, e.g., P=4, K=4, RV={0 3 0 3}, and the time domain resource position being {a starting OFDM symbol, a quantity of OFDM symbols}. The time domain resource position is defined as one TO for completing a single repetition. K=4 means four repetitions are to be transmitted which require four TOs. When data arrives before the first TO, the first TO to the fourth TO may be used for performing transmission four times, which is case 1 in FIG. 11; when data arrives before the second TO, the second TO may be used for transmitting the first repetition, if the base station allows the terminal to transmit beyond the boundary of the period, four repetitions are transmitted before the repeated transmission is terminated, which is case 2 in FIG. 11; when data arrives before the third TO, the third TO may be used for transmitting the first repetition, if the base station allows the terminal to transmit beyond the boundary of the period and allows the terminal to transmit beyond the boundary of the period with the RV value of the repetition changed from 0 to 3, four repetitions are transmitted before the repeated transmission is terminated, which is case 3 in FIG. 11, wherein the RV for the repetition beyond the boundary of the period is changed from 0 to 3; when data arrives before the fourth TO, the fourth TO may be used for transmitting the first repetition, if the base station allows the terminal to transmit beyond the boundary of the period and allows the terminal to transmit beyond the boundary of the period with the RV value of the repetition changed from 0 to 3, four repetitions are transmitted before the repeated transmission is terminated, which is case 4 in FIG. 11, wherein the RV for the repetition beyond the boundary of the period is changed from 0 to 3.

Example 7

Figure 12:
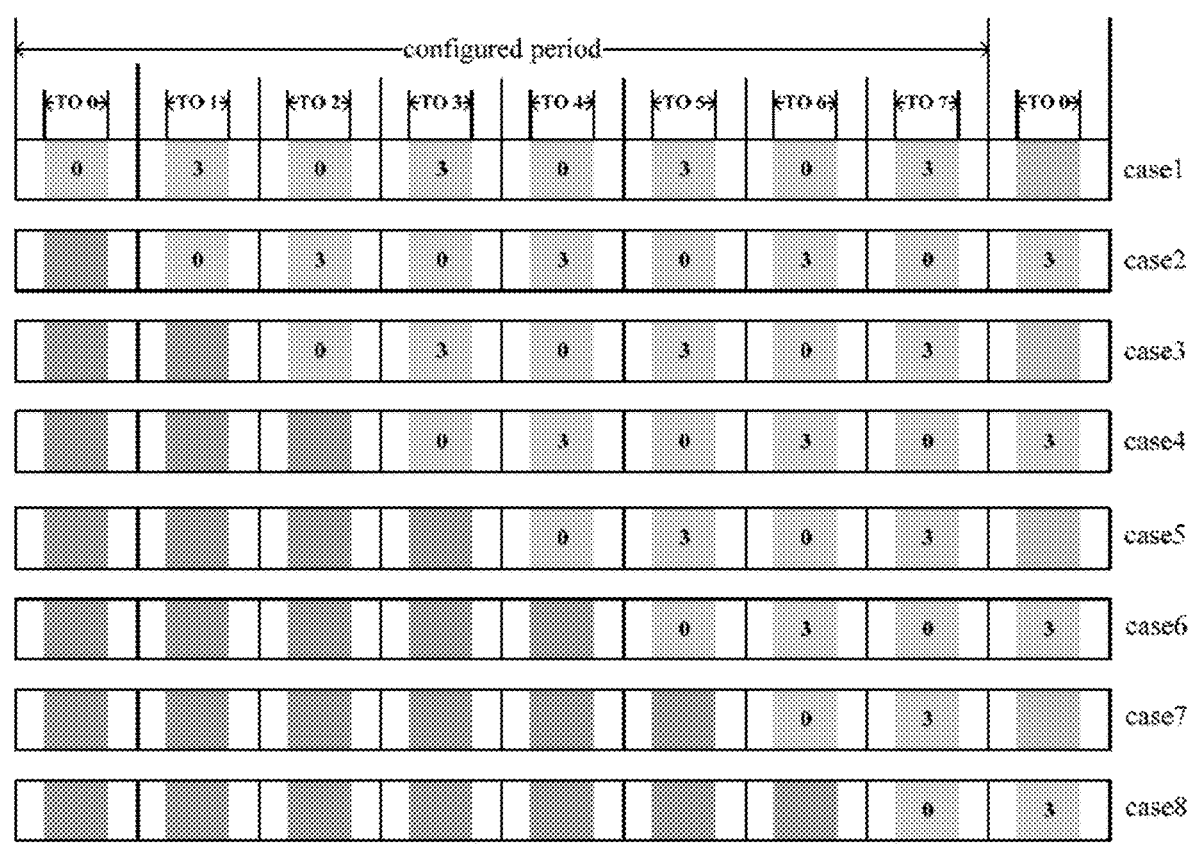

Referring to FIG. 12, according to conventional standards, configuration is performed through RRC, e.g., P=8, K=8, RV={0 3 0 3}, and the time domain resource position being {a starting OFDM symbol, a quantity of OFDM symbols}. The time domain resource position is defined as one TO for completing a single repetition. K=8 means eight repetitions are to be transmitted which require eight TOs. When data arrives before the first TO, the first TO to the eighth TO may be used for performing transmission eight times, which is case 1 in FIG. 12; when data arrives before the second TO, the second TO may be used for transmitting the first repetition, if the base station allows the terminal to transmit beyond the boundary of the period, eight repetitions are transmitted before the repeated transmission is terminated, which is case 2 in FIG. 12; when data arrives before the third TO, the third TO may be used for transmitting the first repetition, if the base station allows the terminal to transmit beyond the boundary of the period, but does not allow the terminal to transmit beyond the boundary of the period with the RV value of the repetition changed from 0 to 3, six repetitions are transmitted before the repeated transmission is terminated, which is case 3 in FIG. 12; the remaining case can be done in a similar fashion; when data arrives before the eighth TO, the eighth TO may be used for transmitting the first repetition, if the base station allows the terminal to transmit beyond the boundary of the period, but does not allow the terminal to transmit beyond the boundary of the period with the RV value of the repetition changed from 0 to 3, two repetitions are transmitted before the repeated transmission is terminated, which is case 8 in FIG. 12.

Example 8

Figure 13:
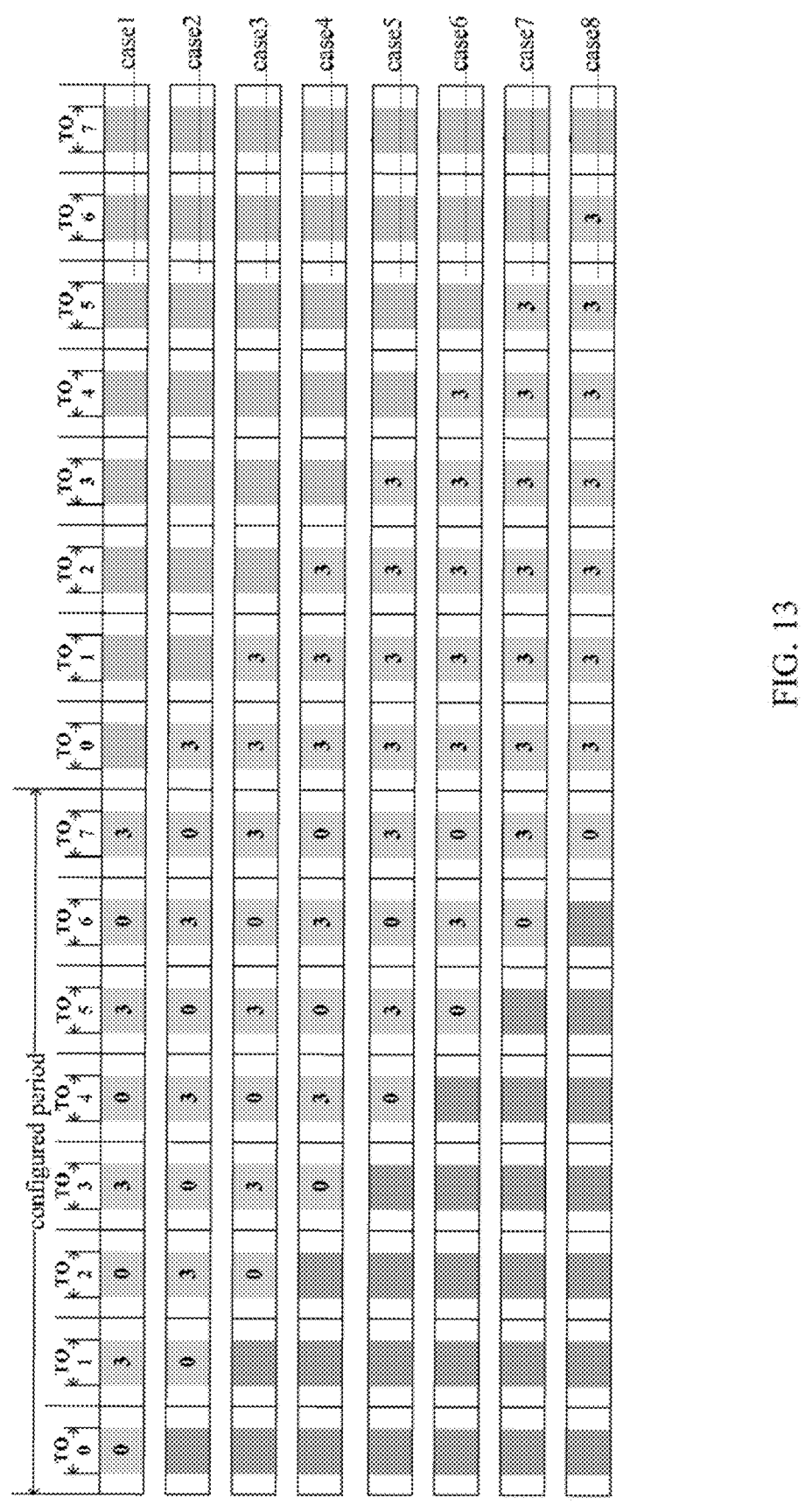

Referring to FIG. 13, according to conventional standards, configuration is performed through RRC, e.g., P=8, K=8, RV={0 3 0 3}, and the time domain resource position being {a starting OFDM symbol, a quantity of OFDM symbols}. The time domain resource position is defined as one TO for completing a single repetition. K=8 means eight repetitions are to be transmitted which require eight TOs. When data arrives before the first TO, the first TO to the eighth TO may be used for performing transmission eight times, which is case 1 in FIG. 13; when data arrives before the second TO, the second TO may be used for transmitting the first repetition, if the base station allows the terminal to transmit beyond the boundary of the period, eight repetitions are transmitted before the repeated transmission is terminated, which is case 2 in FIG. 13; when data arrives before the third TO, the third TO may be used for transmitting the first repetition, if the base station allows the terminal to transmit beyond the boundary of the period and allows the terminal to transmit beyond the boundary of the period with the RV value of the repetition changed from 0 to 3, eight repetitions are transmitted before the repeated transmission is terminated, which is case 3 in FIG. 13; the remaining case can be done in a similar fashion; when data arrives before the eighth TO, the eighth TO may be used for transmitting the first repetition, if the base station allows the terminal to transmit beyond the boundary of the period and allows the terminal to transmit beyond the boundary of the period with the RV value of the repetition changed from 0 to 3, eight repetitions are transmitted before the repeated transmission is terminated, which is case 8 in FIG. 13.

Example 9

Figure 14:
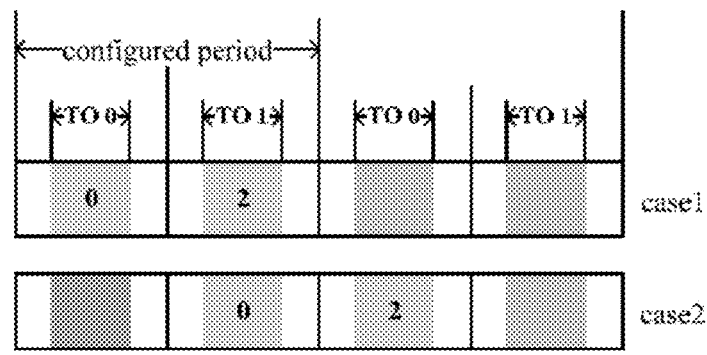
FIG. 14 is a ninth schematic diagram of an application scenario of a data transmission method according to some embodiments of the present disclosure.

Referring to FIG. 14, according to conventional standards, configuration is performed through RRC, e.g., P=2, K=2, RV={0 2 3 1}, and the time domain resource position being {a starting OFDM symbol, a quantity of OFDM symbols}. The time domain resource position is defined as one TO for completing a single repetition. K=2 means two repetitions are to be transmitted which require two TOs. When data arrives before the first TO, the first TO and the second TO may be used for performing transmission twice, which is case 1 in FIG. 14; when data arrives before the second TO, the second TO may be used for transmitting the first repetition, if the base station allows the terminal to transmit beyond the boundary of the period, two repetitions are transmitted before the repeated transmission is terminated, which is case 2 in FIG. 14.

Example 10

Figure 15:
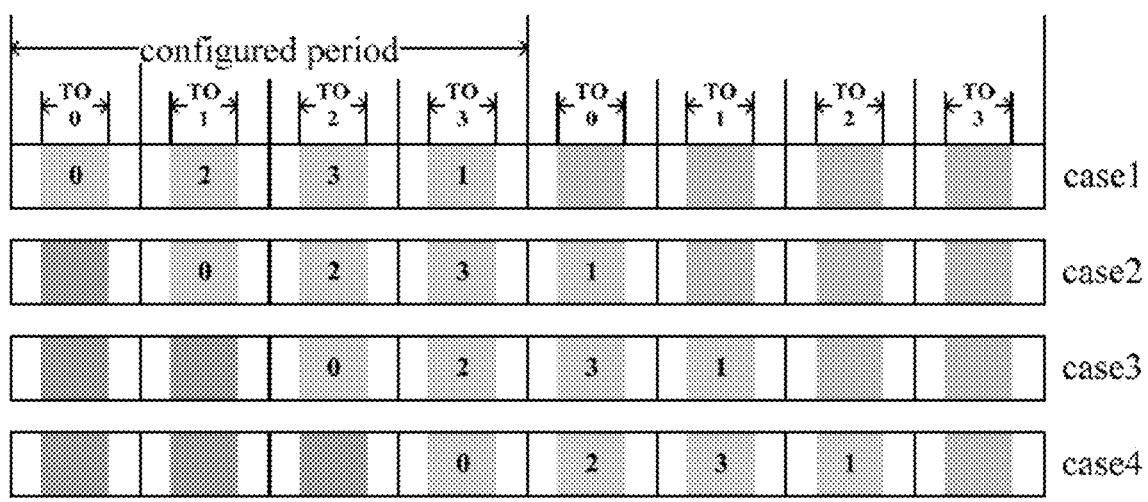
FIG. 15 is a tenth schematic diagram of an application scenario of a data transmission method according to some embodiments of the present disclosure.

Referring to FIG. 15, according to conventional standards, configuration is performed through RRC, e.g., P=4, K=4, RV={0 2 3 1}, and the time domain resource position being {a starting OFDM symbol, a quantity of OFDM symbols}. The time domain resource position is defined as one TO for completing a single repetition. K=4 means four repetitions are to be transmitted which require four TOs.

When data arrives before the first TO, the first TO to the fourth TO may be used for performing transmission four times, which is case 1 in FIG. 15: when data arrives before the second TO, the second TO may be used for transmitting the first repetition, if the base station allows the terminal to transmit beyond the boundary of the period, four repetitions are transmitted before the repeated transmission is terminated, which is case 2 in FIG. 15; when data arrives before the third TO, the third TO may be used for transmitting the first repetition, if the base station allows the terminal to transmit beyond the boundary of the period, four repetitions are transmitted before the repeated transmission is terminated, which is case 3 in FIG. 15; when data arrives before the fourth TO, the fourth TO may be used for transmitting the first repetition, if the base station allows the terminal to transmit beyond the boundary of the period, four repetitions are transmitted before the repeated transmission is terminated, which is case 4 in FIG. 15.

Example 11

Figure 16:
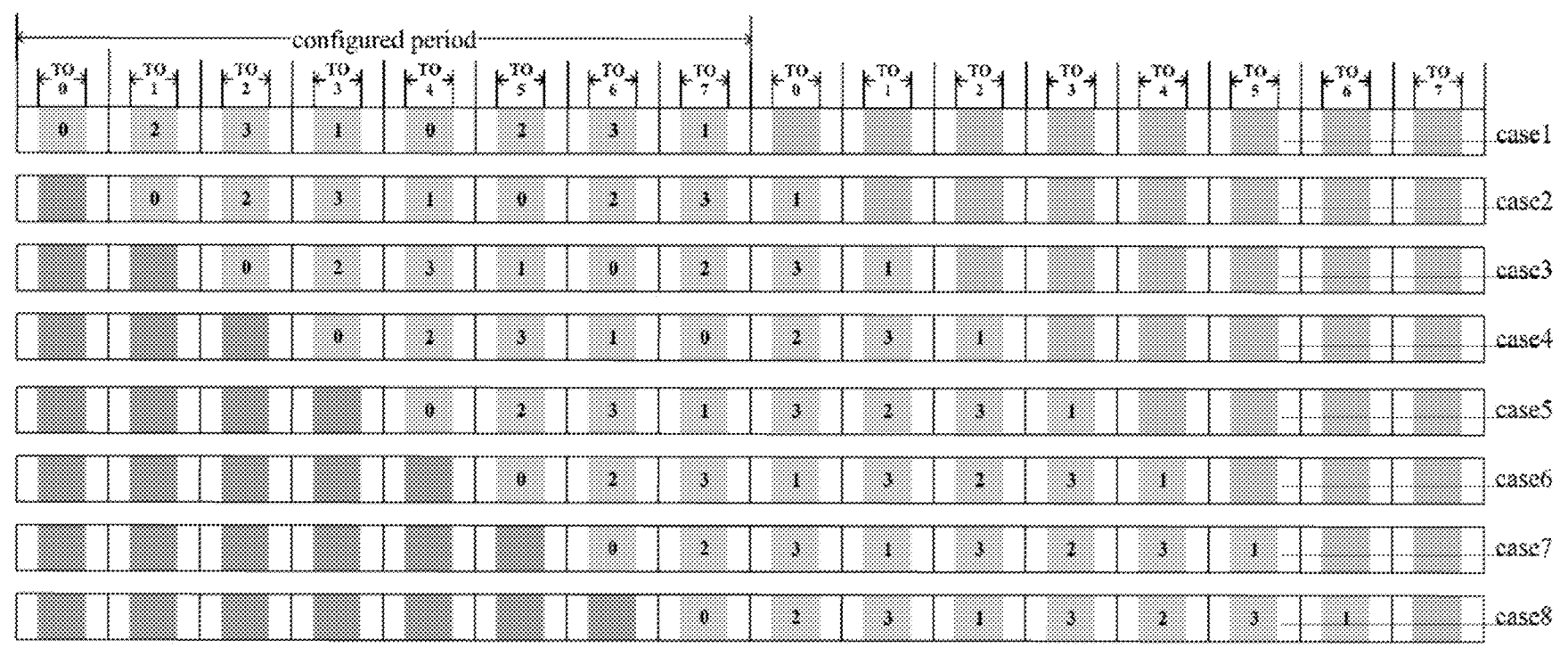

Referring to FIG. 16, according to conventional standards, configuration is performed through RRC, e.g., P=8, K=8, RV={0 2 3 1}, and the time domain resource position being {a starting OFDM symbol, a quantity of OFDM symbols}. The time domain resource position is defined as one TO for completing a single repetition. K=8 means eight repetitions are to be transmitted which require eight TOs. When data arrives before the first TO, the first TO to the eighth TO may be used for performing transmission eight times, which is case 1 in FIG. 16; when data arrives before the second TO, the second TO may be used for transmitting the first repetition, if the base station allows the terminal to transmit beyond the boundary of the period, eight repetitions are transmitted before the repeated transmission is terminated, which is case 2 in FIG. 16; the remaining case can be done in a similar fashion; when data arrives before the fifth TO, the fifth TO may be used for transmitting the first repetition, if the base station allows the terminal to transmit beyond the boundary of the period and allows the terminal to transmit beyond the boundary of the period with the RV value of the repetition changed from 0 to 3, eight repetitions are transmitted before the repeated transmission is terminated, which is case 5 in FIG. 16; the remaining case can be done in a similar fashion; when data arrives before the eighth TO, the eighth TO may be used for transmitting the first repetition, if the base station allows the terminal to transmit beyond the boundary of the period and allows the terminal to transmit beyond the boundary of the period with the RV value of the repetition changed from 0 to 3, eight repetitions are transmitted before the repeated transmission is terminated, which is case 8 in FIG. 16.

Example 12

Figure 17:
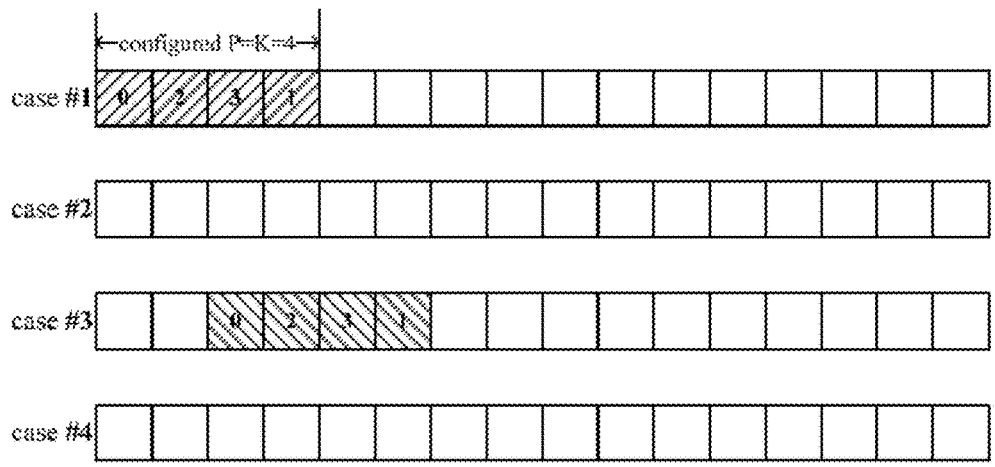
FIG. 17 is a twelfth schematic diagram of an application scenario of a data transmission method according to some embodiments of the present disclosure.

Referring to FIG. 17, according to conventional standards, configuration is performed through RRC, e.g., P=4, K=4, RV={0 2 3 1}, and the time domain resource position being {a starting OFDM symbol, a quantity of OFDM symbols}. The time domain resource position is defined as one TO for completing a single repetition. K=4 means four repetitions are to be transmitted which require four TOs. In the configured period, the first TO and the third TO are the only TOs allowed to transmit the first repetition, and the second TO and the fourth TO are not allowed to transmit the first repetition. When data arrives before the first TO, the first TO to the fourth TO may be used for performing transmission four times, which is case 1 in FIG. 17; when data arrives before the third TO, the third TO may be used for transmitting the first repetition, if the base station allows the terminal to transmit beyond the boundary of the period, four repetitions are transmitted before the repeated transmission is terminated, which is case 3 in FIG. 17.

Example 13

Multiple modes may be standardized simultaneously. For example, a first mode may achieve lower implementation complexity of base station receiver, while reaching a compromise between high reliability (ensuring K repetitions as far as possible) and low latency (ensuring transmission at each TO as far as possible), wherein the compromise may be reached by configuring different RV sequences; a second mode may achieve high reliability, while reaching a compromise between lower implementation complexity of base station receiver and low latency, wherein the compromise may be reached by configuring different quantities of uplink non-scheduled configurations; and a third mode may achieve low latency, while reaching a compromise between lower implementation complexity of base station receiver and high reliability, wherein the compromise may be reached by configuring different quantities of TOs beyond the boundary of the period. The base station informs, via RRC signaling or downlink control information (DCI), the terminal of which mode should be used by the terminal to perform repeated transmission of uplink data.

The quantity K of repetition, the relationship between the period P and the K, the length of the RV sequence, and the change of RV value from 0 to 1 or 2 or 3 and the like may be configured in a flexible manner, and it is not necessary to adhere to the values set forth in the embodiments.

Example 14

The base station configures, via RRC signaling, for the terminal an RV sequence A for one period and an RV sequence B for repetitions beyond the boundary of the period. In a sequential order, each value in the RV sequence B is different from a value at corresponding position in the RV sequence A.

Figure 18:
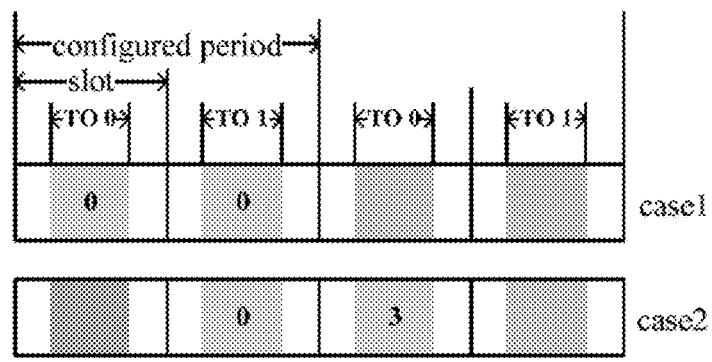
FIG. 18 is a thirteenth schematic diagram of an application scenario of a data transmission method according to some embodiments of the present disclosure.

According to conventional standards, configuration is performed through RRC, e.g., P=2, K=2, RV={0 0 0 0}, and the time domain resource position being {a starting OFDM symbol, a quantity of OFDM symbols}. The time domain resource position is defined as one TO for completing a single repetition. K=2 means two repetitions are to be transmitted which require two TOs. When data arrives before the first TO, the first TO and the second TO may be used for performing transmission twice, which is case 1 in FIG. 18; when data arrives before the second TO, the second TO may be used for transmitting the first repetition, and the first TO beyond the boundary of the period is used to transmit the second repetition with the RV value of 0 being changed to 3, then the repeated transmission is terminated. Although the RV value is changed to 3 in these cases, the RV value may be changed to 2 or 1, which depends on the configuration by the base station.

In this example, the RV sequence A is {0 0}, and the RV sequence B is {3}.

Example 15

The base station configures, via RRC signaling, for the terminal an RV sequence A for one period and an RV sequence B for repetitions beyond the boundary of the period. In a sequential order, each value in the RV sequence B is different from a value at corresponding position in the RV sequence A.

According to conventional standards, configuration is performed through RRC, e.g., P=4, K=4, RV={0 0 0 0}, and the time domain resource position being {a starting OFDM symbol, a quantity of OFDM symbols}. The time domain resource position is defined as one TO for completing a single repetition. K=4 means four repetitions are to be transmitted which require four TOs.

Figure 19:
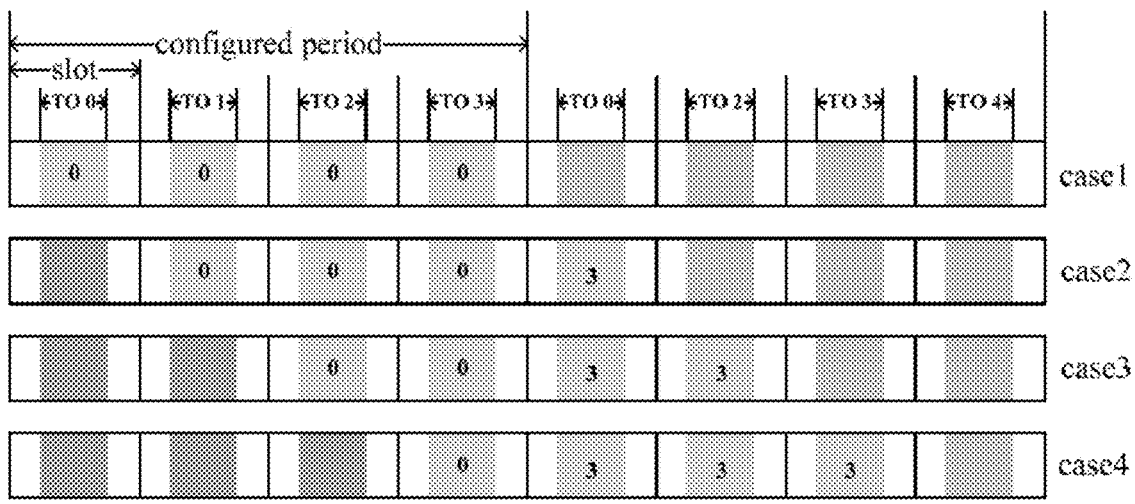
FIG. 19 is a fourteenth schematic diagram of an application scenario of a data transmission method according to some embodiments of the present disclosure.

When data arrives before the first TO, the first TO to the fourth TO may be used for performing transmission four times, which is case 1 in FIG. 19; when data arrives before the second TO, the second TO may be used for transmitting the first repetition, the third TO and the fourth TO are used to transmit the second and third repetitions respectively, and then the boundary of the period is crossed, the first TO beyond the boundary of the period is used to transmit the fourth repetition with the RV value of 0 being changed to 3, which is case 2 in FIG. 19; when data arrives before the third TO, the third TO may be used for transmitting the first repetition, the fourth TO is used to transmit the second repetition, and then the boundary of the period is crossed, the first TO and the second TO beyond the boundary of the period are used to transmit the third and fourth repetitions respectively with the RV value of 0 being changed to 3, which is case 3 in FIG. 19; when data arrives before the fourth TO, the fourth TO may be used for transmitting the first repetition, and then the boundary of the period is crossed, the first TO, the second TO and the third TO beyond the boundary of the period are used to transmit the second, third and fourth repetitions respectively with the RV value of 0 being changed to 3, which is case 4 in FIG. 19.

Although the RV value for each TO is changed to 3 in these cases, the RV value may be changed to 2 or 1, which depends on the configuration by the base station.

In this example, the RV sequence A is {0 0 0 0}, and the RV sequence B is {3 3 3}.

Example 16

The base station configures, via RRC signaling, for the terminal an RV sequence A for one period and an RV sequence B for repetitions beyond the boundary of the period. In a sequential order, each value in the RV sequence B is different from a value at corresponding position in the RV sequence A.

According to conventional standards, configuration is performed through RRC, e.g., P=8, K=8, RV={0 0 0 0}, and the time domain resource position being {a starting OFDM symbol, a quantity of OFDM symbols}. The time domain resource position is defined as one TO for completing a single repetition. K=8 means eight repetitions are to be transmitted which require eight TOs.

Figure 20:
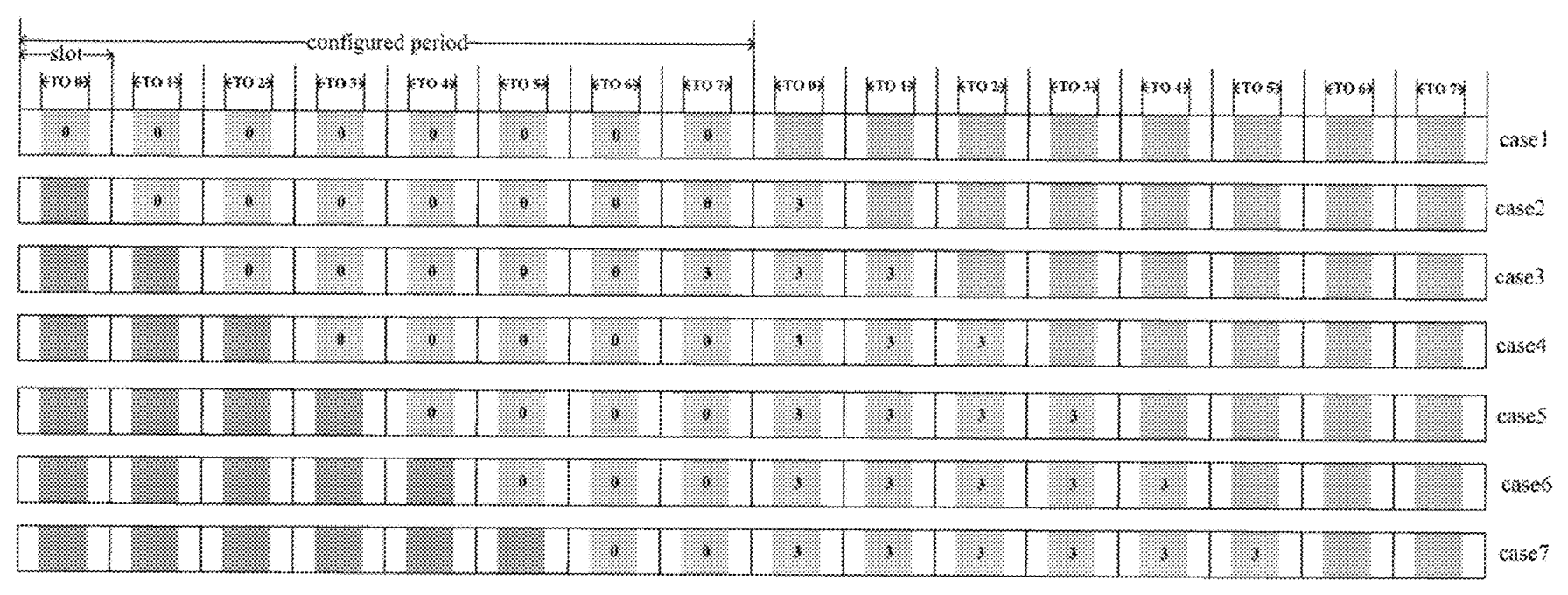

When data arrives before the first TO, the first TO to the eighth TO may be used for performing transmission eight times, which is case 1 in FIG. 20; when data arrives before the second TO, the second TO may be used for transmitting the first repetition, the third TO and the eighth TO are used to transmit the second to seventh repetitions respectively, and then the boundary of the period is crossed, the first TO beyond the boundary of the period is used to transmit the eighth repetition with the RV value of 0 being changed to 3, which is case 2 in FIG. 20; the remaining case can be done in a similar fashion; when data arrives before the seventh TO, the seventh TO may be used for transmitting the first repetition, the eighth TO is used to transmit the second repetition, and then the boundary of the period is crossed, the first TO to the sixth TO beyond the boundary of the period are used to transmit the third to eighth repetitions respectively with the RV value of 0 being changed to 3, which is case 7 in FIG. 20.

Although the RV value for each TO is changed to 3 in these cases, the RV value may be changed to 2 or 1, which depends on the configuration by the base station.

In this example, the RV sequence A is {0 0 0 0 0 0 0 0}, and the RV sequence B is {3 3 3 3 3 3 3}.

Example 17

The base station configures, via RRC signaling, for the terminal an RV sequence A for one period and an RV sequence B for repetitions beyond the boundary of the period. In a sequential order, each value in the RV sequence B is different from a value at corresponding position in the RV sequence A.

According to conventional standards, configuration is performed through RRC, e.g., P=4, K=4, RV={0 3 0 3}, and the time domain resource position being {a starting OFDM symbol, a quantity of OFDM symbols}. The time domain resource position is defined as one TO for completing a single repetition. K=4 means four repetitions are to be transmitted which require four TOs.

Figure 21:
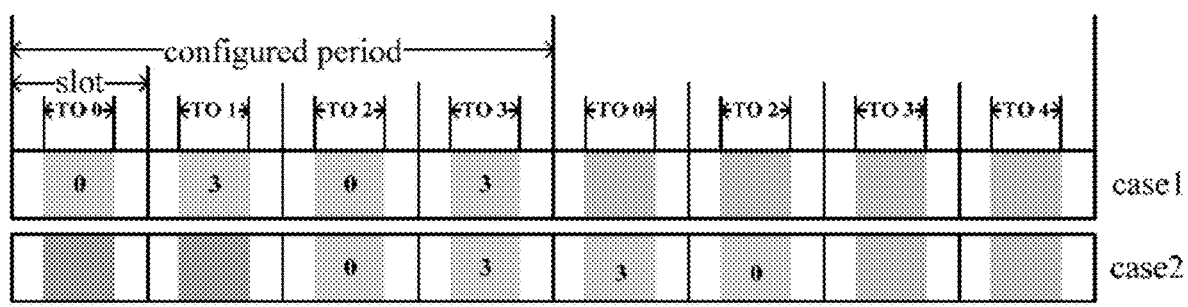
FIG. 21 is a sixteenth schematic diagram of an application scenario of a data transmission method according to some embodiments of the present disclosure.

When data arrives before the first TO, the first TO to the fourth TO may be used for performing transmission four times, which is case 1 in FIG. 21; when data arrives before the third TO, the third TO may be used for transmitting the first repetition, the fourth TO is used to transmit the second repetition, and then the boundary of the period is crossed, the first TO beyond the boundary of the period is used to transmit the third repetition with the RV value of 0 being changed to 3, the second TO beyond the boundary of the period is used to transmit the fourth repetition with the RV value of 0 being changed to 3, which is case 2 in FIG. 21.

In these cases, the RV for each TO may be changed to other value, which depends on the configuration by the base station.

In this example, the RV sequence A is {0 3 0 3}, and the RV sequence B is {3 0}.

Example 18

The base station configures, via RRC signaling, for the terminal an RV sequence A for one period and an RV sequence B for repetitions beyond the boundary of the period. In a sequential order, each value in the RV sequence B is different from a value at corresponding position in the RV sequence A.

According to conventional standards, configuration is performed through RRC, e.g., P=8, K=8, RV={0 3 0 3}, and the time domain resource position being {a starting OFDM symbol, a quantity of OFDM symbols}. The time domain resource position is defined as one TO for completing a single repetition. K=8 means eight repetitions are to be transmitted which require eight TOs.

Figure 22:
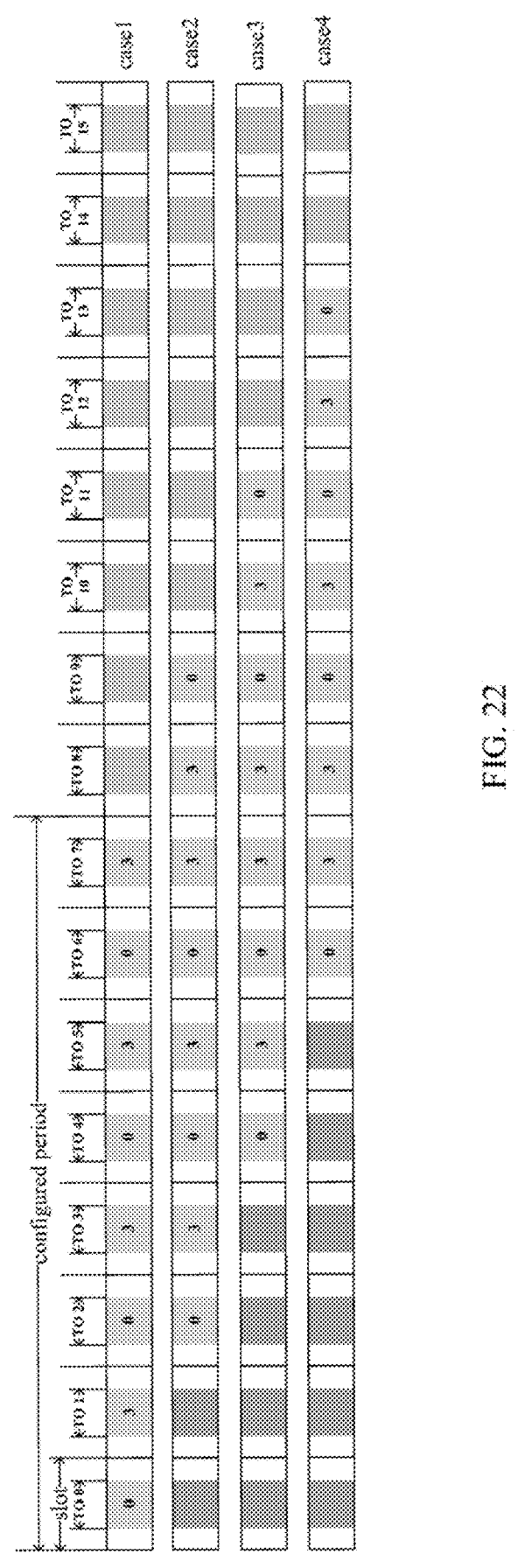

When data arrives before the first TO, the first TO to the eighth TO may be used for performing transmission eight times, which is case 1 in FIG. 22; when data arrives before the third TO, the third TO to the eighth TO may be used for transmitting the first six repetitions, and then the boundary of the period is crossed, the first TO and the second TO beyond the boundary of the period are used to transmit the remaining two repetitions with the RV value of 0 being changed to 3 and the RV value of 3 being changed to 0, which is case 2 in FIG. 22; when data arrives before the fifth TO, the fifth TO to the eighth TO may be used for transmitting the first four repetitions, and then the boundary of the period is crossed, the first TO to the fourth TO beyond the boundary of the period are used to transmit the remaining four repetitions with the RV value of 0 being changed to 3 and the RV value of 3 being changed to 0, which is case 3 in FIG. 22; when data arrives before the seventh TO, the seventh TO and the eighth TO may be used for transmitting the first two repetitions, and then the boundary of the period is crossed, the first TO to the sixth TO beyond the boundary of the period are used to transmit the remaining six repetitions with the RV value of 0 being changed to 3 and the RV value of 3 being changed to 0, which is case 4 in FIG. 22.

In these cases, the RV for each TO may be changed to other value, which depends on the configuration by the base station.

In this example, the RV sequence A is {0 3 0 3 0 3 0 3}, and the RV sequence B is {3 0 3 0 3 0}.

Example 19

The base station configures, via RRC signaling, for the terminal an RV sequence A for one period and an RV sequence B for repetitions beyond the boundary of the period. In a sequential order, each value in the RV sequence B is different from a value at corresponding position in the RV sequence A.

Figure 23:
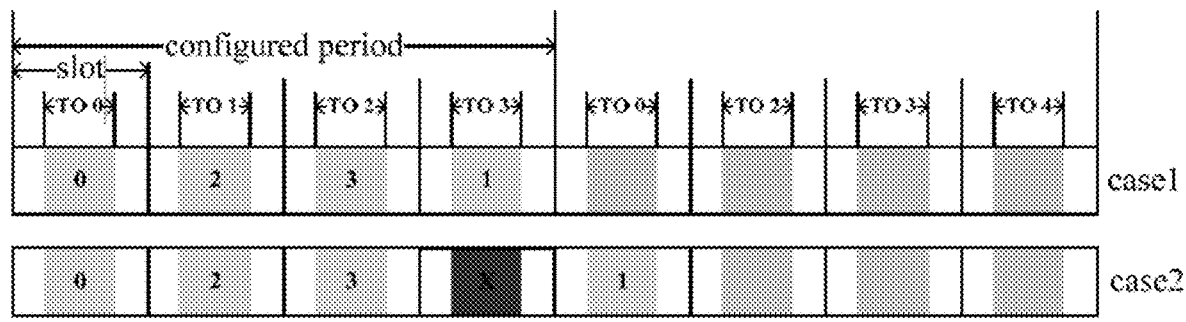
FIG. 23 is an eighteenth schematic diagram of an application scenario of a data transmission method according to some embodiments of the present disclosure.

According to conventional standards, configuration is performed through RRC, e.g., P=4, K=4, RV={0 2 3 1}, and the time domain resource position being {a starting OFDM symbol, a quantity of OFDM symbols}. The time domain resource position is defined as one TO for completing a single repetition. K=4 means four repetitions are to be transmitted which require four TOs. When data arrives before the first TO, the first TO to the fourth TO may be used for performing transmission four times, which is case 1 in FIG. 23; when the fourth TO cannot be used by the terminal for certain reason, the boundary of the period is crossed, the first TO beyond the boundary of the period is used to transmit the fourth repetition, and the RV value may be changed as needed, which is case 2 in FIG. 23.

In this example, the RV sequence A is {0 2 3 1}, and the RV sequence B is {1}.

Figure 24:
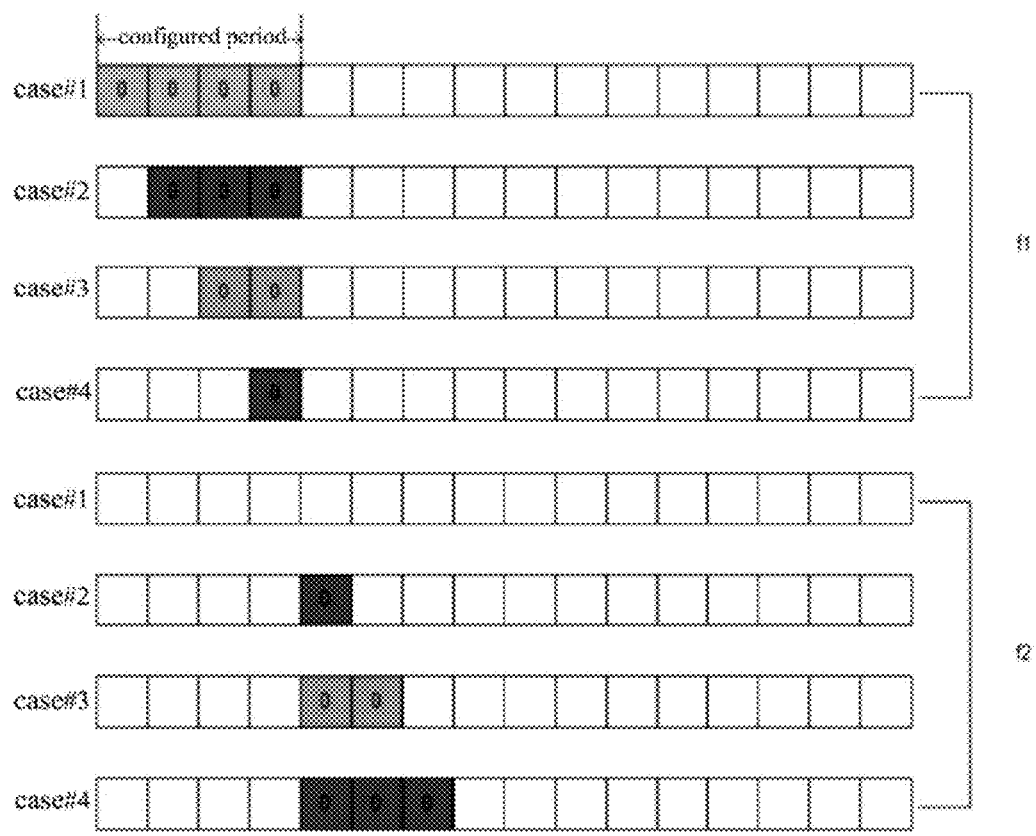
FIG. 24 is a nineteenth schematic diagram of an application scenario of a data transmission method according to some embodiments of the present disclosure.

In another example, some embodiments of the present disclosure further provide a data transmission method, as shown in FIG. 24.

On the network device side, the method includes: the network device transmits resource configuration information to a terminal via RRC or DCI signaling, wherein the resource configuration information is used to control K repetitions for transmitting a transport block (TB). The resource configuration information at least includes a first resource and a second resource, wherein the first resource is located in a first resource position before the end boundary of the current period, and the second resource is located in a second resource position after the end boundary of the current period.

On the terminal side, the method includes: the terminal starts to transmit data to a network device on a first resource configured in one period, and in case that the K repetitions of the terminal are not completed before the end boundary of the current period, the remaining repetitions need to be transmitted beyond the end boundary of the current period, at this time, the resource needs to be changed from the first resource to the second resource.

In FIG. 24, f1 denotes the first resource, and f2 denotes the second resource. According to conventional standards, configuration is performed through RRC, e.g., P=4, K=4, RV={0 0 0 0}, and the time domain resource position being {a starting OFDM symbol, a quantity of OFDM symbols}. The time domain resource position is defined as one TO for completing a single repetition. K=4 means four repetitions are to be transmitted which require four TOs. The frequency domain resource position are f1 and f2, the first resource f1 is used for the repetition before the end boundary of the current period, and the second resource f2 is used for the repetition after the end boundary of the current period. When data arrives before the second TO, the second TO to the fourth TO before the end boundary of the current period may be used for transmitting the first three repetitions, and the first TO after the end boundary of the current period is used to transmit the last repetition, which is case 2 in FIG. 24; in the case that the boundary of the period is crossed, the first three repetition use the first resource and the last repetition uses the second resource.

In another example, some embodiments of the present disclosure further provide a data transmission method.

On the network device side, the method includes: the network device transmits DMRS configuration information to a terminal via RRC or DCI signaling, wherein the DMRS configuration information is used to support K repetitions for transmitting a transport block (TB). The DMRS configuration information at least includes a first DMRS and a second DMRS, wherein the first DMRS is used to support the repetition before the end boundary of the current period, and the second DMRS is used to support the repetition after the end boundary of the current period. The second DMRS may be another antenna port, or another configuration parameter of the DMRS, or another parameter in a process of generating the DMRS.

On the terminal side, the method includes: the terminal starts to transmit data to a network device in one period, and in case that the K repetitions of the terminal are not completed before the end boundary of the current period, the remaining repetitions need to be transmitted beyond the end boundary of the current period, at this time, the DMRS needs to be changed from the first DMRS to the second DMRS.

Figure 25:
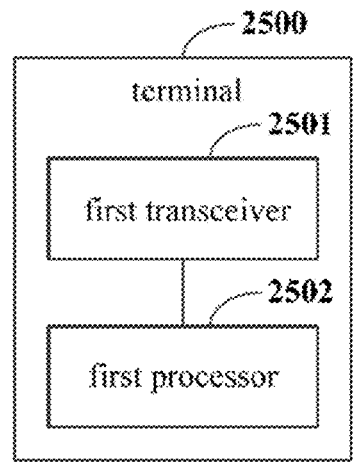
FIG. 25 is a first schematic structural diagram of a terminal according to some embodiments of the present disclosure.

Referring to FIG. 25, some embodiments of the present disclosure provide a terminal 2500. The terminal 2500 includes a first transceiver 2501 and a first processor 2502.

The first transceiver 2501 is configured to start to transmit data to a network device on a resource configured in one period; and the first processor 2502 is configured to change an RV value or a resource or a DMRS from a current value to another value in case that the terminal needs to transmit data beyond a boundary of the period.

The first transceiver 2501 is further configured to receive resource configuration information configured by the network device, wherein the resource configuration information at least includes one or more of: a resource allocation period, a quantity K of repetitions, an RV sequence, resource positions of K transmission occasions in the period, information as to whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period.

In some embodiments of the present disclosure, optionally, the first processor 2502 is further configured to determine, according to the resource configuration information, one or more of: the boundary of the period; positions of the K transmission occasions; and an RV value for a repetition at each transmission occasion.

Optionally, the first transceiver 2501 is further configured to transmit a first repetition at any one transmission occasion within the period, and in case that there is still a transmission occasion available in the period and a total quantity of repetitions is less than the K, transmit a subsequent repetition at the transmission occasion.

In some embodiments of the present disclosure, optionally, the first processor 2502 is further configured to select an earliest transmission occasion within the period to transmit the first repetition, wherein an RV value for the first repetition is equal to a first value in the RV sequence, the first value being 0.

In some embodiments of the present disclosure, optionally, the first processor 2502 is further configured to: judge whether a repetition goes beyond the boundary of the period when the terminal transmits the repetition; and continue to transmit the repetition according to an RV value in the RV sequence in case that the repetition does not go beyond the boundary of the period and a total quantity of repetitions is less than a quantity K of repetitions, and then continue to judge whether a subsequent repetition goes beyond the boundary of the period.

In some embodiments of the present disclosure, optionally, the first processor 2502 is further configured to: judge whether a repetition goes beyond the boundary of the period when the terminal transmits the repetition; and terminate repeated transmission in case that the repetition goes beyond the boundary of the period and the network device does not allow the terminal to transmit beyond the boundary of the period.

In some embodiments of the present disclosure, optionally, the first processor 2502 is further configured to: in case that the network device allows the terminal to transmit beyond the boundary of the period, adjust a repetition transmitted beyond the boundary of the period and having an RV value of 0 to a repetition with other RV value, and leave a repetition transmitted beyond the boundary of the period and having an RV value other than 0 unchanged; or, in case that the network device allows the terminal to transmit beyond the boundary of the period, assign an RV value to a repetition transmitted beyond the boundary of the period according to another RV sequence for transmission beyond the boundary of the period.

In some embodiments of the present disclosure, optionally, the first processor 2502 is further configured to: judge whether a repetition goes beyond the boundary of the period when the terminal transmits the repetition; judge whether an RV value in an RV sequence is 0 in case that it is judged that the repetition goes beyond the boundary of the period and the network device allows the terminal to transmit beyond the boundary of the period; and continue to transmit the repetition according to the RV value in the RV sequence in case that the RV value in the RV sequence is not 0 and a total quantity of repetitions is less than a quantity K of repetitions, and then continue to judge whether a subsequent repetition goes beyond the boundary of the period.

In some embodiments of the present disclosure, optionally, the first processor 2502 is further configured to: judge whether a repetition goes beyond the boundary of the period when the terminal transmits the repetition; judge whether an RV value in the RV sequence is 0 in case that it is judged that the repetition goes beyond the boundary of the period and the network device allows the terminal to transmit beyond the boundary of the period; and transmit the repetition according to another RV value in case that the RV value in the RV sequence is 0 and a total quantity of repetitions is less than a quantity K of repetitions, and then continue to judge whether a subsequent repetition goes beyond the boundary of the period.

In some embodiments of the present disclosure, optionally, the first processor 2502 is further configured to: assign a value to a DMRS for a repetition transmitted beyond the boundary of the period according to another DMRS for transmission beyond the boundary of the period in case that the network device allows the terminal to transmit beyond the boundary of the period, wherein the another DMRS may be another antenna port, or another configuration parameter of the DMRS, or another parameter in a process of generating the DMRS.

In some embodiments of the present disclosure, the terminal performs communication according to resources configured by the network device, so as to reach a compromise between high reliability and high complexity while ensuring low latency.

Figure 26:
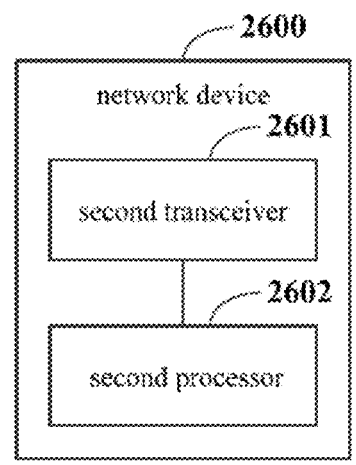
FIG. 26 is a first schematic structural diagram of a network device according to some embodiments of the present disclosure.

Referring to FIG. 26, some embodiments of the present disclosure provide a network device 2600. The network device 2600 includes a second transceiver 2601 and a second processor 2602.

The second transceiver 2601 is configured to transmit resource configuration information to a terminal, wherein the resource configuration information at least includes one or more of: a resource allocation period, a quantity of repetitions, an RV sequence, positions of a first quantity of resources in the period, information as to whether the network device allow the terminal to transmit beyond the boundary of the period, another RV sequence for transmission beyond the boundary of the period, another DMRS for transmission beyond the boundary of the period; wherein the first quantity is equal to the quantity of repetitions.

In some embodiments of the present disclosure, the terminal performs communication according to resources configured by the network device, so as to reach a compromise between high reliability and high complexity while ensuring low latency.

Figure 27:
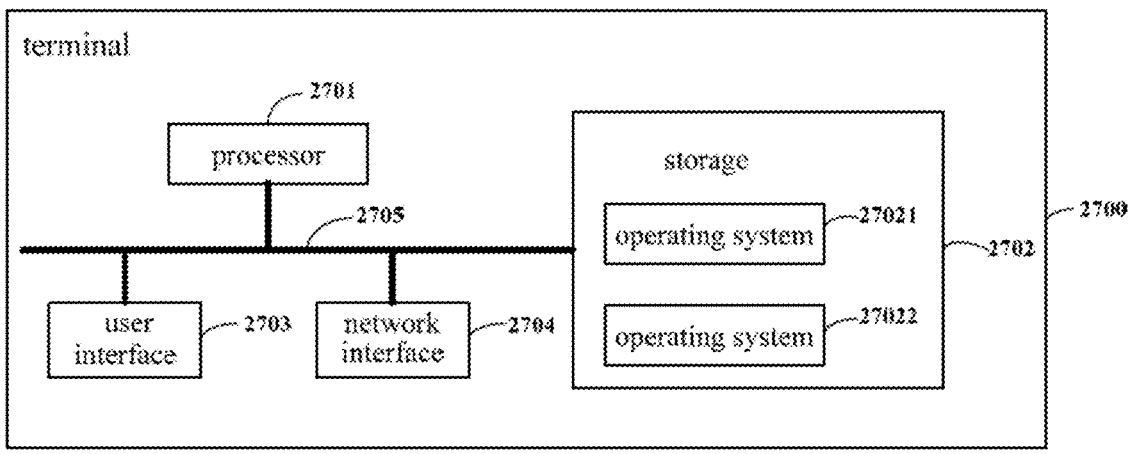
FIG. 27 is a second schematic structural diagram of a terminal according to some embodiments of the present disclosure.

Referring to FIG. 27, some embodiments of the present disclosure provide another terminal 2700. The terminal 2700 includes at least one processor 2701, a storage 2702, a user interface 2703, and at least one network interface 2704. The various components in the terminal 2700 are coupled together by a bus system 2705.

It may be understood that the bus system 2705 is configured to implement connection and communication among these components. The bus system 2705 further includes a power bus, a control bus, and a status signal bus in addition to a data bus. However, for clarity of description, various buses in FIG. 27 are all labeled as the bus system 2705.

The user interface 2703 may include a display, a keyboard or a point-and-click device (for example, a mouse, a trackball, a touch pad, a touch screen, or the like).

It may be understood that the storage 2702 in embodiments of the present disclosure may be a volatile storage or a nonvolatile storage, or may include both a volatile storage and a nonvolatile storage. The nonvolatile storage may be a read-only memory (ROM), a programmable ROM (PROM), an erasable programmable PROM (EPROM), an electrically EPROM (EEPROM) or a flash memory. The volatile storage may be a random access memory (RAM), which is used as an external cache. By way of example rather than limitation, many forms of RAMs such as a static RAM (SRAM), a dynamic RAM (DRAM), a synchronous DRAM (SDRAM), a double-data-rate (DDR) SDRAM, an enhanced SDRAM (ESDRAM), a synch link DRAM (SLDRAM), and a direct Rambus RAM (DRRAM) may be used. The storage 2702 described in embodiments of the present disclosure is intended to include, but is not limited to, these and any other appropriate types of storages.

In some implementations, the storage 2702 stores executable modules or data structures, or a subset thereof, or an extended set thereof, for example, an operating system (OS) 27021 and an application program 27022.

The operating system 27021 includes various system programs, such as a framework layer program, a core library layer program, and a driver layer program, to implement various basic services and process a hardware-based task. The application program 27022 includes various application programs such as a media player or a browser, to implement various application services. A program for implementing the method provided in some embodiments of the present disclosure may be included in the application program 27022.

In some embodiments of the present disclosure, the terminal 2700 may further include a computer program stored in the storage 2702 and configured to be executed by the processor 2701. The processor 2701 is configured to execute the computer program to implement the steps of the data transmission method provided in some embodiments of the present disclosure.

The foregoing method disclosed in some embodiments of the present disclosure may be applied to the processor 2701 or implemented by the processor 2701. The processor 2701 may be an integrated circuit chip having a signal processing capability. During implementation, the steps in the foregoing method may be accomplished by hardware integrated logic circuits or instructions in a software form in the processor 2701. The processor 2701 may be a general-purpose processor, a digital signal processor (DSP), an application-specific integrated circuit (ASIC), a field-programmable gate array (FPGA) or other programmable logic device, discrete gate or transistor logic device, a discrete hardware component, that can implement or execute the methods, steps, and logic block diagrams disclosed in some embodiments of the present disclosure. The general-purpose processor may be a microprocessor or the processor may be any conventional processor or the like. The steps in the method disclosed with reference to some embodiments of the present disclosure may be directly performed and accomplished by a hardware decoding processor, or performed and accomplished by a combination of hardware and software modules in a decoding processor. The software modules may reside in a computer-readable storage medium well-established in the art, such as a RAM, a flash memory, a ROM, a PROM or an electrically erasable programmable memory or a register. A computer-readable storage medium is located in the storage 2702. The processor 2701 reads information from the storage 2702 and accomplishes the steps in the foregoing method using hardware of the processor 2701. Specifically, a computer program is stored in the computer-readable storage medium.

Figure 28:
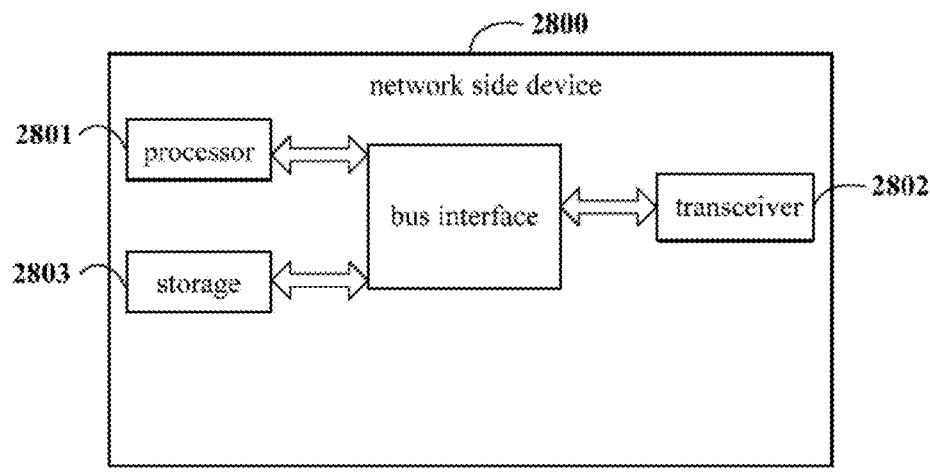
FIG. 28 is a second schematic structural diagram of a network device according to some embodiments of the present disclosure.

Referring to FIG. 28, some embodiments of the present disclosure provide another communication device 2800. The communication device 2800 includes: a processor 2801, a transceiver 2802, a storage 2803 and a bus interface.

The processor 2801 is responsible for supervising the bus architecture and normal operation. The storage 2803 stores data being used by the processor 2801 during operation.

In some embodiments of the present disclosure, the communication device 2800 may further include a program stored in the storage 2803 and configured to be executed by the processor 2801, wherein the processor 2801 is configured to execute the program to implement the steps of data configuration method provided in some embodiments of the present disclosure.

In FIG. 28, a bus architecture may include any number of interconnected buses and bridges, and connects various circuits including one or more processors specifically represented by the processor 2801 and storage represented by the storage 2803. The bus architecture may also connect various other circuits such as peripherals, voltage regulators and power management circuits, which is well known in the art. Therefore, a further description thereof is omitted in some embodiments of the present disclosure. A bus interface provides an interface. The transceiver 2802 may be multiple elements, that is, including a transmitter and a receiver, to allow for communication with various other apparatuses on the transmission medium.

Some embodiments of the present disclosure further provide a computer readable storage medium storing therein a computer program, wherein the computer program is configured to be executed by a processor, to implement various processes of the embodiments of the foregoing data transmission methods, and may achieve the same technical effects. To avoid repetition, a detailed description is omitted herein. The computer readable storage medium is such as a read-only memory (ROM), a random access memory (RAM), a magnetic disk or an optical disc.

Figure 29:
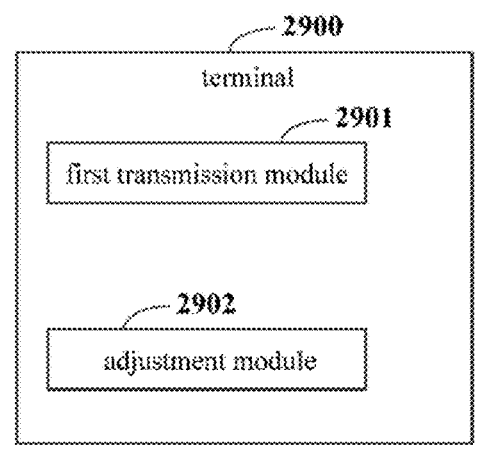
FIG. 29 is a third schematic structural diagram of a terminal according to some embodiments of the present disclosure.

Referring to FIG. 29, some embodiments of the present disclosure provide a terminal 2900. The terminal 2900 includes: a first transmission module 2901, configured to start to transmit data to a network device on a resource configured in one period; and an adjustment module 2902, configured to change an RV value or a resource or a DMRS from a current value to another value in case that the terminal needs to transmit data beyond a boundary of the period.

In some embodiments of the present disclosure, optionally, the terminal further includes: a reception module, configured to receive resource configuration information configured by the network device, wherein the resource configuration information at least includes one or more of: a resource allocation period, a quantity K of repetitions, an RV sequence, resource positions of K transmission occasions in the period, information as to whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period.

Optionally, the terminal further includes: a determination module, configured to determine, according to the resource configuration information, one or more of: the boundary of the period; positions of the K transmission occasions; and an RV value for a repetition at each transmission occasion.

In some embodiments of the present disclosure, optionally, the terminal further includes: a first transmission module, configured to transmit a first repetition at any one transmission occasion within the period, and in case that there is still a transmission occasion available in the period and a total quantity of repetitions is less than the K, transmit a subsequent repetition at the transmission occasion.

In some embodiments of the present disclosure, optionally, the terminal further includes: a second transmitting module, configured to select an earliest transmission occasion within the period to transmit the first repetition, wherein an RV value for the first repetition is equal to a first value in the RV sequence, the first value being 0.

In some embodiments of the present disclosure, optionally, the terminal further includes: a first judgement module, configured to judge whether a repetition goes beyond the boundary of the period when the terminal transmits the repetition; and continue to transmit the repetition according to an RV value in the RV sequence in case that the repetition does not go beyond the boundary of the period and a total quantity of repetitions is less than a quantity K of repetitions, and then continue to judge whether a subsequent repetition goes beyond the boundary of the period.

In some embodiments of the present disclosure, optionally, the terminal further includes: a second judgement module, configured to judge whether a repetition goes beyond the boundary of the period when the terminal transmits the repetition; and terminate repeated transmission in case that the repetition goes beyond the boundary of the period and the network device does not allow the terminal to transmit beyond the boundary of the period.

In some embodiments of the present disclosure, optionally, the terminal further includes: a third judgement module, configured to, in case that the network device allows the terminal to transmit beyond the boundary of the period, adjust a repetition transmitted beyond the boundary of the period and having an RV value of 0 to a repetition with other RV value, and leave a repetition transmitted beyond the boundary of the period and having an RV value other than 0 unchanged.

In some embodiments of the present disclosure, optionally, the terminal further includes: a fourth judgement module, configured to judge whether a repetition goes beyond the boundary of the period when the terminal transmits the repetition; judge whether an RV value in an RV sequence is 0 in case that it is judged that the repetition goes beyond the boundary of the period and the network device allows the terminal to transmit beyond the boundary of the period; and continue to transmit the repetition according to the RV value in the RV sequence in case that the RV value in the RV sequence is not 0 and a total quantity of repetitions is less than a quantity K of repetitions, and then continue to judge whether a subsequent repetition goes beyond the boundary of the period.

In some embodiments of the present disclosure, optionally, the terminal further includes: a fifth judgement module, configured to judge whether a repetition goes beyond the boundary of the period when the terminal transmits the repetition; judge whether an RV value in the RV sequence is 0 in case that it is judged that the repetition goes beyond the boundary of the period and the network device allows the terminal to transmit beyond the boundary of the period; and transmit the repetition according to another RV value in case that the RV value in the RV sequence is 0 and a total quantity of repetitions is less than a quantity K of repetitions, and then continue to judge whether a subsequent repetition goes beyond the boundary of the period.

In some embodiments of the present disclosure, optionally, the terminal further includes: a sixth judgement module, configured to: assign a value to a DMRS for a repetition transmitted beyond the boundary of the period according to another DMRS for transmission beyond the boundary of the period in case that the network device allows the terminal to transmit beyond the boundary of the period, wherein the another DMRS may be another antenna port, or another configuration parameter of the DMRS, or another parameter in a process of generating the DMRS.

In some embodiments of the present disclosure, the terminal performs communication according to resources configured by the network device, so as to reach a compromise between high reliability and high complexity while ensuring low latency.

Figure 30:
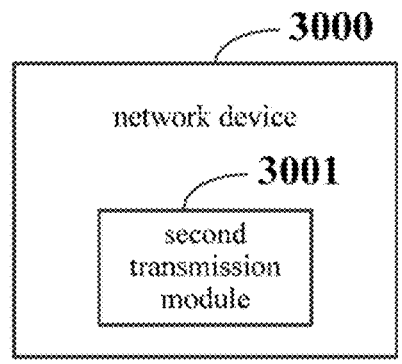
FIG. 30 is a third schematic structural diagram of a network device according to some embodiments of the present disclosure.

Referring to FIG. 30, some embodiments of the present disclosure provide a network device 3000. The network device 3000 includes: a second transmission module 3001, configured to transmit resource configuration information to a terminal, wherein the resource configuration information at least includes one or more of: a resource allocation period, a quantity of repetitions, an RV sequence, positions of a first quantity of resources in the period, information as to whether the network device allow the terminal to transmit beyond the boundary of the period, another RV sequence for transmission beyond the boundary of the period, another DMRS for transmission beyond the boundary of the period; wherein the first quantity is equal to the quantity of repetitions.

In some embodiments of the present disclosure, the terminal performs communication according to resources configured by the network device, so as to reach a compromise between high reliability and high complexity while ensuring low latency.

The steps of the method or algorithm described in the present disclosure may be implemented in form of hardware, or implemented in form of a software instruction executable by a processor. The software instruction may be composed of corresponding software modules, and the software modules may be stored in an RAM, flash memory, ROM, EPROM, EEPROM, register, hard disk, removable hard disk, read-only optical disc or any other form of storage medium well known in the art. An exemplary storage medium is coupled to a processor, so that the processor may read information from the storage medium and write information to storage medium. Certainly, the storage medium may be a part of the processor. The processor and the storage medium may reside in an ASIC. In addition, the ASIC may reside in a core network interface device. Certainly, the processor and the storage medium may also reside in the core network interface device as discrete components.

Persons skilled in the art would appreciate that, in the foregoing one or more examples, the functions described by the present disclosure may be implemented with hardware, software, firmware or any combination thereof. When being implemented with software, these functions may be stored in a computer readable medium or transmitted as one or more instructions or codes in a computer readable medium. The computer readable medium includes a computer storage medium and a communication medium. The communication medium includes any medium facilitating the transmission of a computer program from one place to another. The storage medium may be any available medium accessible by a general purpose computer or a special purpose computer.

The foregoing specific implementations are provided to illustrate the objective, technical solutions and beneficial effects of the present disclosure in further details. It is understood, the above descriptions merely describe specific implementations of the present disclosure, but the scope of the present disclosure is not limited thereto. Any modifications, equivalent replacements or improvements made on the basis of the technical solution of the disclosure shall fall within the scope of the present disclosure.

It is appreciated by a person skilled in the art that, some embodiments of the present disclosure may be implemented as a method, system or computer program product. Therefore, some embodiments of the present disclosure may take the form of a complete hardware embodiment, complete software embodiment or combination of hardware and software. Moreover, some embodiments of the present disclosure may take the form of a computer program product embodied as one or more computer usable storage media (including, but not limited to, a magnetic disk storage, CD-ROM, optical storage or the like) storing therein computer usable program codes.

Some embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing device to produce a machine, such that the instructions, which are executed via the processor of the computer or other programmable data processing device, create means for implementing the functions specified in the flow or flows of the flow diagram and/or the block or blocks of the block diagram.

These computer program instructions may also be stored in a computer-readable storage that can direct a computer or other programmable data processing device to function in a particular manner, such that the instructions stored in the computer-readable storage produce an article of manufacture including instruction means which implement the function specified in the flow or flows of the flow diagram and/or the block or blocks of the block diagram.

The computer program instructions may also be loaded onto a computer or other programmable data processing device to cause a series of operational steps to be performed on the computer or other programmable device to produce a computer-implemented process such that the instructions which are executed on the computer or other programmable device provide steps for implementing the functions specified in the flow or flows of the flow diagram and/or the block or blocks of the block diagram.

Those skilled in the art will appreciate that modifications and variants may be made in some embodiments of the present disclosure without departing from the scope and spirit of the present disclosure. It is intended that the present disclosure encompasses the modifications and variants to some embodiments of the present disclosure if these modifications and variants fall within the scope of the claims of the present disclosure and its equivalents.

What is claimed is:

1. A data transmission method, applied to a terminal, comprising:
   starting to transmit data to a network device on a resource configured in one period; and
   changing a redundancy version (RV) value or a resource or a demodulation reference signal (DMRS) from a current value to another value in case that the terminal needs to transmit data beyond a boundary of the period.

2. The data transmission method according to claim 1, further comprising:
   receiving resource configuration information configured by the network device, wherein the resource configuration information at least comprises one or more of: a resource allocation period, a quantity K of repetitions, an RV sequence, resource positions of K transmission occasions in the period, whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period.

3. The data transmission method according to claim 2, wherein, after the receiving the resource configuration information configured by the network device, the method further comprises:
   determining, according to the resource configuration information, one or more of:
   the boundary of the period;
   positions of the K transmission occasions; and
   an RV value for a repetition at each transmission occasion.

4. The data transmission method according to claim 2, wherein, after the receiving the resource configuration information configured by the network device, the method further comprises:
   transmitting a first repetition at any one transmission occasion within the period, and
   in case that there is still a transmission occasion available in the period and a total quantity of repetitions is less than the K, transmitting a subsequent repetition at the transmission occasion.

5. The data transmission method according to claim 4, wherein the transmitting the first repetition at any one transmission occasion within the period comprises:
   selecting an earliest transmission occasion within the period to transmit the first repetition, wherein an RV value for the first repetition is equal to a first value in the RV sequence, the first value being 0.

6. The data transmission method according to claim 1, further comprising:
   judging whether a repetition goes beyond the boundary of the period when the terminal transmits the repetition; and
   continuing to transmit the repetition according to an RV value in an RV sequence in case that the repetition does not go beyond the boundary of the period and a total quantity of repetitions is less than a quantity K of repetitions, and then continuing to judge whether a subsequent repetition goes beyond the boundary of the period.

7. The data transmission method according to claim 1, further comprising:
   judging whether a repetition goes beyond the boundary of the period when the terminal transmits the repetition; and
   terminating repeated transmission in case that the repetition goes beyond the boundary of the period and the network device does not allow the terminal to transmit beyond the boundary of the period.

8. The data transmission method according to claim 1, further comprising:
   in case that the network device allows the terminal to transmit beyond the boundary of the period, adjusting a repetition transmitted beyond the boundary of the period and having an RV value of 0 to a repetition with other RV value, and leaving a repetition transmitted beyond the boundary of the period and having an RV value other than 0 unchanged; or,
   in case that the network device allows the terminal to transmit beyond the boundary of the period, assigning an RV value to a repetition transmitted beyond the boundary of the period according to another RV sequence for transmission beyond the boundary of the period.

9. The data transmission method according to claim 8, wherein, in case that the network device allows the terminal to transmit beyond the boundary of the period, the adjusting a repetition transmitted beyond the boundary of the period and having an RV value of 0 to a repetition with other RV value, and leaving a repetition transmitted beyond the boundary of the period and having an RV value other than 0 unchanged, comprises:
 judging whether a repetition goes beyond the boundary of the period when the terminal transmits the repetition;
 judging whether an RV value in an RV sequence is 0 in case that it is judged that the repetition goes beyond the boundary of the period and the network device allows the terminal to transmit beyond the boundary of the period; and
 continuing to transmit the repetition according to the RV value in the RV sequence in case that the RV value in the RV sequence is not 0 and a total quantity of repetitions is less than a quantity K of repetitions, and then continuing to judge whether a subsequent repetition goes beyond the boundary of the period.

10. The data transmission method according to claim 8, wherein, in case that the network device allows the terminal to transmit beyond the boundary of the period, the adjusting a repetition transmitted beyond the boundary of the period and having an RV value of 0 to a repetition with other RV value, and leaving a repetition transmitted beyond the boundary of the period and having an RV value other than 0 unchanged, comprises:
 judging whether a repetition goes beyond the boundary of the period when the terminal transmits the repetition;
 judging whether an RV value in an RV sequence is 0 in case that it is judged that the repetition goes beyond the boundary of the period and the network device allows the terminal to transmit beyond the boundary of the period; and
 transmitting the repetition according to another RV value in case that the RV value in the RV sequence is 0 and a total quantity of repetitions is less than a quantity K of repetitions, and then continuing to judge whether a subsequent repetition goes beyond the boundary of the period.

11. The data transmission method according to claim 1, further comprising:
 assigning a value to a DMRS for a repetition transmitted beyond the boundary of the period according to another DMRS for transmission beyond the boundary of the period in case that the network device allows the terminal to transmit beyond the boundary of the period, wherein the another DMRS is another antenna port, or another configuration parameter of the DMRS, or another parameter in a process of generating the DMRS.

12. A data transmission method, applied to a network device, comprising:
 transmitting resource configuration information to a terminal, wherein the resource configuration information at least comprises one or more of: a resource allocation period, a quantity of repetitions, an RV sequence, positions of a first quantity of resources in the period, whether the network device allow the terminal to transmit beyond the boundary of the period, another RV sequence for transmission beyond the boundary of the period, another DMRS for transmission beyond the boundary of the period; wherein the first quantity is equal to the quantity of repetitions.

13. A terminal, comprising a processor, a non-transitory storage and a program stored in the non-transitory storage and configured to be executed by the processor, wherein the processor is configured to execute the program to implement the steps of:
 starting to transmit data to a network device on a resource configured in one period; and
 changing a redundancy version (RV) value or a resource or a demodulation reference signal (DMRS) from a current value to another value in case that the terminal needs to transmit data beyond a boundary of the period.

14. A network device, comprising a processor, a non-transitory storage and a program stored in the non-transitory storage and configured to be executed by the processor, wherein the processor is configured to execute the program to implement the steps of the data transmission method according to claim 12.

15. The terminal according to claim 13, wherein the processor is configured to execute the program to implement the steps of:
 receiving resource configuration information configured by the network device, wherein the resource configuration information at least comprises one or more of: a resource allocation period, a quantity K of repetitions, an RV sequence, resource positions of K transmission occasions in the period, whether the network device allow the terminal to transmit beyond the boundary of the period, a quantity of transmission occasions for allowed transmission beyond the boundary of the period, a transmission occasion of an initial repetition allowed in the period, another RV sequence for transmission beyond the boundary of the period, another DMRS for transmission beyond the boundary of the period.

16. The terminal according to claim 15, wherein, after the receiving the resource configuration information configured by the network device, the processor is configured to execute the program to implement the steps of:
 determining, according to the resource configuration information, one or more of:
 the boundary of the period;
 positions of the K transmission occasions; and
 an RV value for a repetition at each transmission occasion.

17. The terminal according to claim 15, wherein, after the receiving the resource configuration information configured by the network device, the processor is configured to execute the program to implement the steps of:
 transmitting a first repetition at any one transmission occasion within the period, and
 in case that there is still a transmission occasion available in the period and a total quantity of repetitions is less than the K, transmitting a subsequent repetition at the transmission occasion.

18. The terminal according to claim 17, wherein the processor is configured to execute the program to implement the steps of:
 selecting an earliest transmission occasion within the period to transmit the first repetition, wherein an RV value for the first repetition is equal to a first value in the RV sequence, the first value being 0.

19. The terminal according to claim 13, wherein the processor is configured to execute the program to implement the steps of:

judging whether a repetition goes beyond the boundary of the period when the terminal transmits the repetition; and continuing to transmit the repetition according to an RV value in an RV sequence in case that the repetition does not go beyond the boundary of the period and a total quantity of repetitions is less than a quantity K of repetitions, and then continuing to judge whether a subsequent repetition goes beyond the boundary of the period.

20. The terminal according to claim 13, wherein the processor is configured to execute the program to implement the steps of:

judging whether a repetition goes beyond the boundary of the period when the terminal transmits the repetition; and terminating repeated transmission in case that the repetition goes beyond the boundary of the period and the network device does not allow the terminal to transmit beyond the boundary of the period.

* * * * *